(12) United States Patent
Hyakudai et al.

(10) Patent No.: US 12,457,089 B2
(45) Date of Patent: *Oct. 28, 2025

(54) COMMUNICATION APPARATUS AND COMMUNICATION SYSTEM

(71) Applicant: Sony Semiconductor Solutions Corporation, Kanagawa (JP)

(72) Inventors: Toshihisa Hyakudai, San Diego, CA (US); Junya Yamada, Kanagawa (JP); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 8 days.

This patent is subject to a terminal disclaimer.

(21) Appl. No.: 18/264,112

(22) PCT Filed: Feb. 3, 2022

(86) PCT No.: PCT/JP2022/004160
§ 371 (c)(1),
(2) Date: Aug. 3, 2023

(87) PCT Pub. No.: WO2022/172838
PCT Pub. Date: Aug. 18, 2022

(65) Prior Publication Data
US 2024/0089074 A1 Mar. 14, 2024

Related U.S. Application Data

(63) Continuation of application No. 17/536,751, filed on Nov. 29, 2021, now Pat. No. 11,743,024.
(Continued)

(51) Int. Cl.
*H04B 3/00* (2006.01)
*G10L 19/02* (2013.01)
(Continued)

(52) U.S. Cl.
CPC ............ *H04L 7/0008* (2013.01); *G10L 19/02* (2013.01); *H03L 7/18* (2013.01); *H04L 7/06* (2013.01); *H04L 69/22* (2013.01)

(58) Field of Classification Search
CPC ......... H04L 7/0008; H04L 7/06; H04L 69/22; H03L 7/18; H03L 7/085; G10L 19/02; G06F 13/4278; G06F 1/04; H04B 14/02
(Continued)

(56) References Cited

U.S. PATENT DOCUMENTS 6,914,637 B1 7/2005 Wolf
8,780,939 B2 7/2014 Bafra
(Continued)

FOREIGN PATENT DOCUMENTS

JP 2008005193 A 1/2008
JP 2011239011 A 11/2011
JP 2012155233 A 8/2012

OTHER PUBLICATIONS

International Search Report (PCT/ISA/210), International Application No. PCT/JP2022/004160, dated Apr. 26, 2022.
(Continued)

*Primary Examiner* — Phuong Phu
(74) *Attorney, Agent, or Firm* — Michael Best & Friedrich LLP

(57) ABSTRACT

Communication apparatus with correct audio signal regeneration are disclosed. In one example, a communication apparatus includes a counter that counts the number of a predetermined reference clock included in one cycle of a divided signal of an audio master clock with a frequency that is equal to a product of a frequency of a sampling clock for sampling of an audio signal and a multiplier on the basis of the audio master clock, a ratio of division of the divided signal and the predetermined reference clock. A packet
(Continued)

generator generates a packet including the counted number counted, a bit width of SD (Serial Data) conforming to an I2S standard, the frequency of the sampling clock, the ratio of division of the divided signal to the audio master clock, a frequency ratio of the frequency of the audio master clock to the frequency of the sampling clock, and the SD.

16 Claims, 27 Drawing Sheets

Related U.S. Application Data

(60) Provisional application No. 63/148,022, filed on Feb. 10, 2021.

(51) Int. Cl.
*H03L 7/18* (2006.01)
*H04L 7/00* (2006.01)
*H04L 7/06* (2006.01)
*H04L 25/00* (2006.01)
*H04L 69/22* (2022.01)

(58) Field of Classification Search
USPC ............... 375/257, 258, 354, 362, 371, 373
See application file for complete search history.

(56) References Cited

U.S. PATENT DOCUMENTS

| | | | |
|---|---|---|---|
| 10,178,144 B1 | 1/2019 | Shu | |
| 11,036,460 B2* | 6/2021 | Chen | ............... H04B 14/02 |
| 11,614,914 B2* | 3/2023 | Chen | ............... G06F 1/04 |
| | | | 700/94 |
| 11,743,024 B2* | 8/2023 | Hyakudai | ............ G06F 13/4278 |
| | | | 375/262 |
| 2001/0044713 A1 | 11/2001 | Lokhoff | |
| 2002/0163598 A1* | 11/2002 | Pasqualino | ............. H03L 7/085 |
| | | | 375/E7.274 |
| 2004/0080671 A1 | 4/2004 | Siemens | |
| 2013/0322439 A1 | 12/2013 | Verhallen | |
| 2014/0143587 A1 | 5/2014 | Rajapakse | |
| 2016/0041941 A1 | 2/2016 | Kessler | |
| 2021/0173611 A1 | 6/2021 | Chen | |

OTHER PUBLICATIONS

NXP. I2S (Inter-IC Sound Bus) Transmit and Receive on RT600 HiFi4. AN12749. REV.0. Feb. 28, 2020. pp. 1-13. [retrieved on Apr. 15, 2022]. Internet<URL: https://www.nxp.com/docs/en/application-note/ AN127 49 .pdf> particularly pp. 5-7.

* cited by examiner

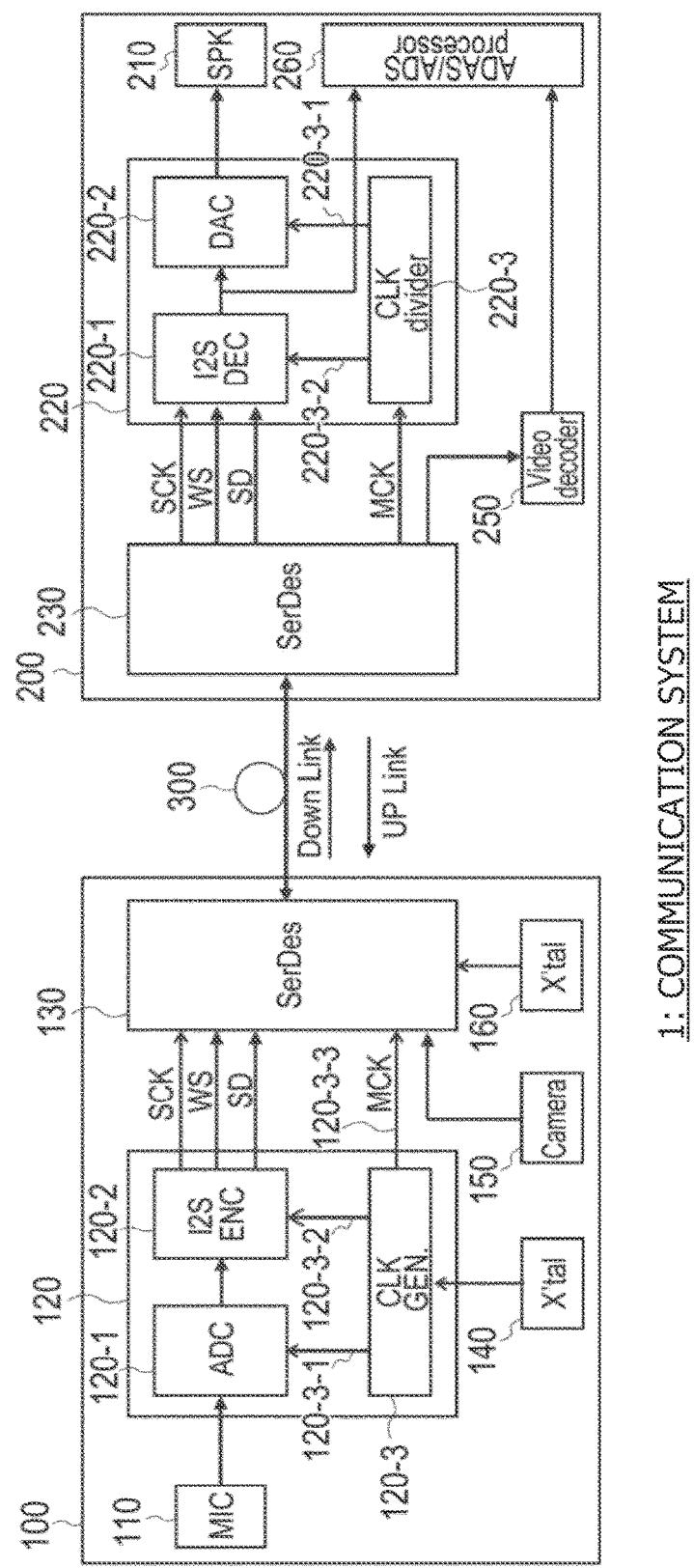

FDD

TDD

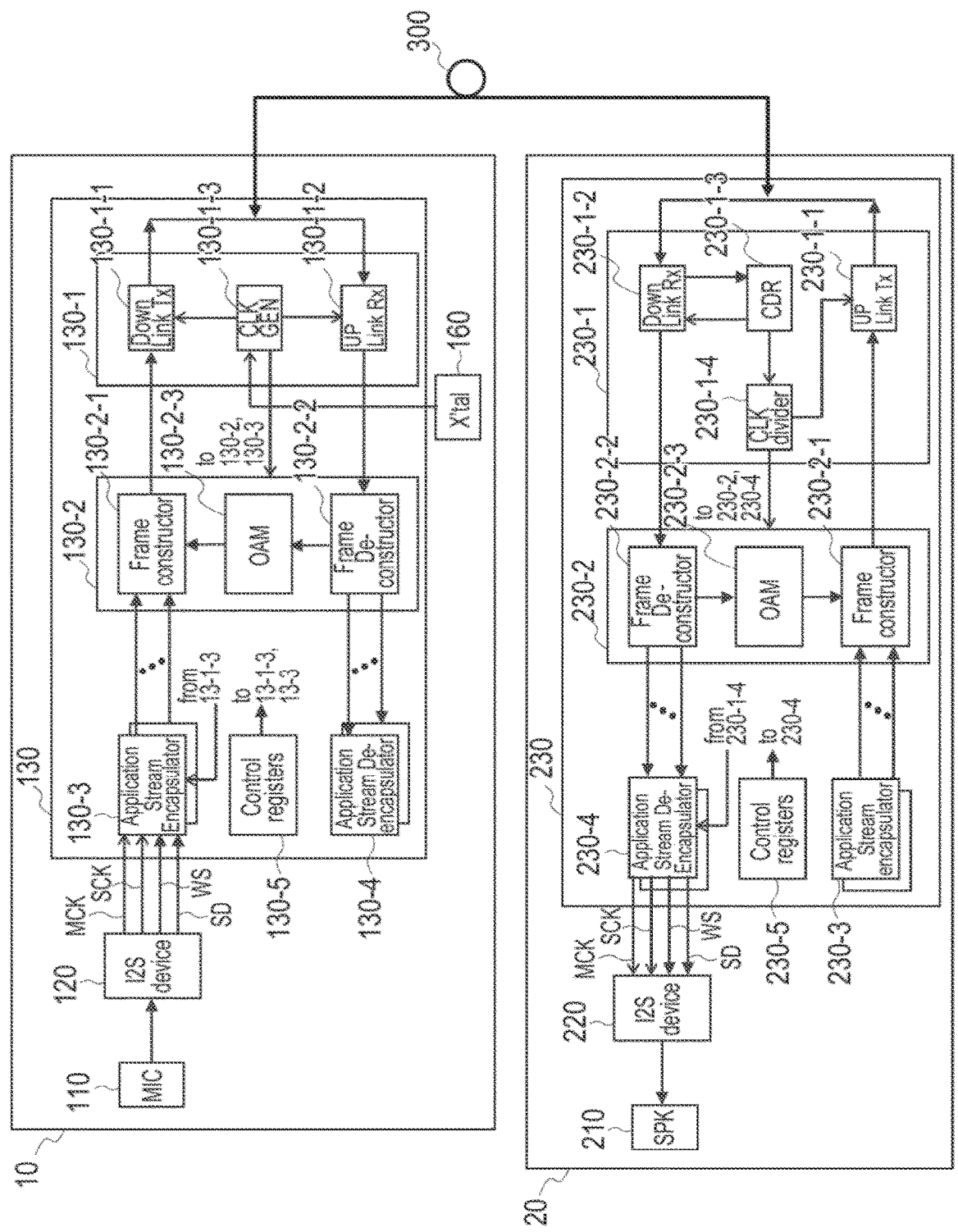
F I G . 4

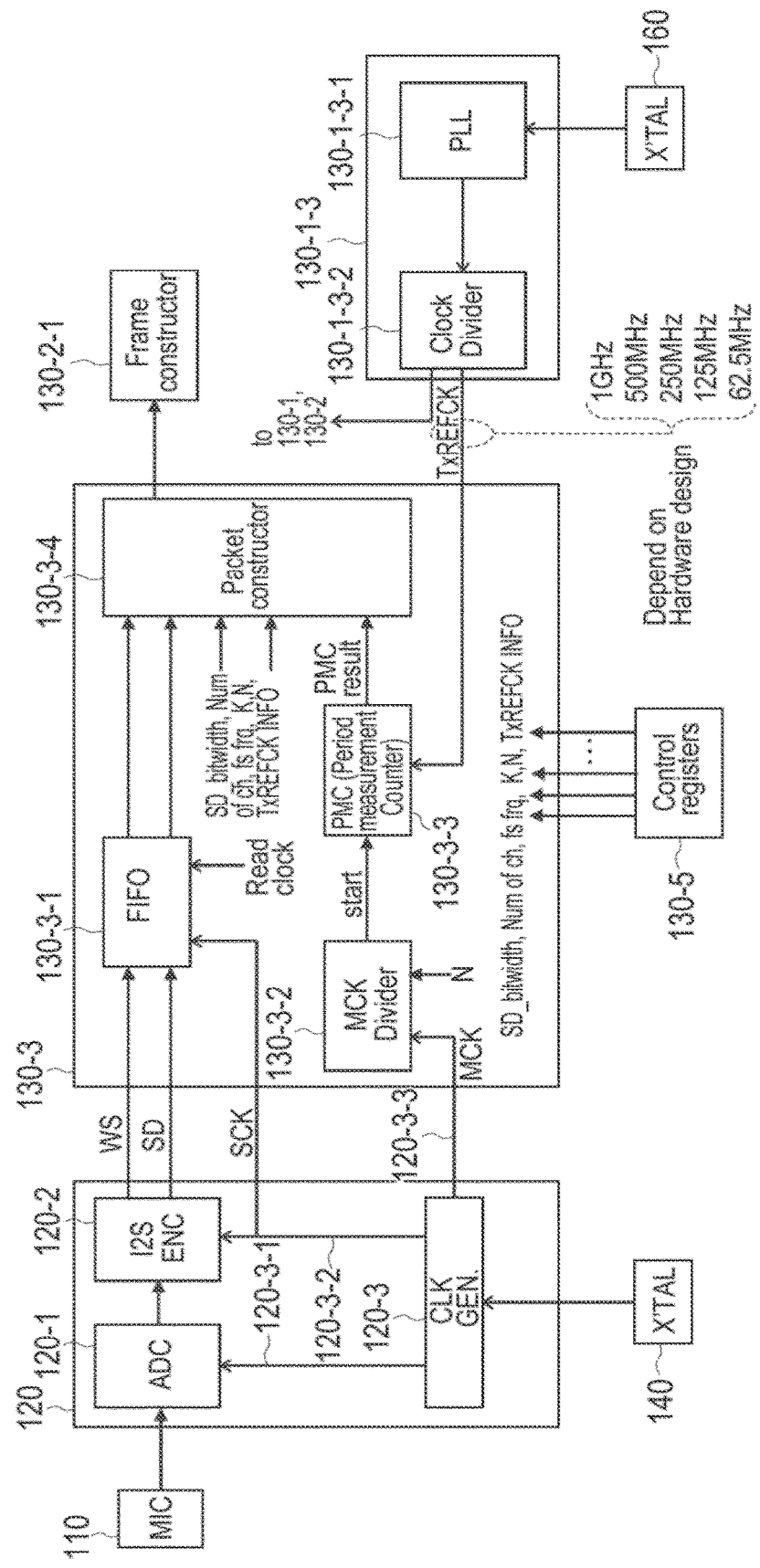
F I G. 6

FIG.8

| TxREFCK | [MHz] | 250 | |
|---|---|---|---|
| fs | [kHz] | 44.1 | 48.0 |
| K | | 512 | |
| MCK (K*fs) | [MHz] | 22.5792 | 24.576 |
| N | | 7056 | 1536 |
| (Expected) PMC result value (M) | | 78125 | 15625 |

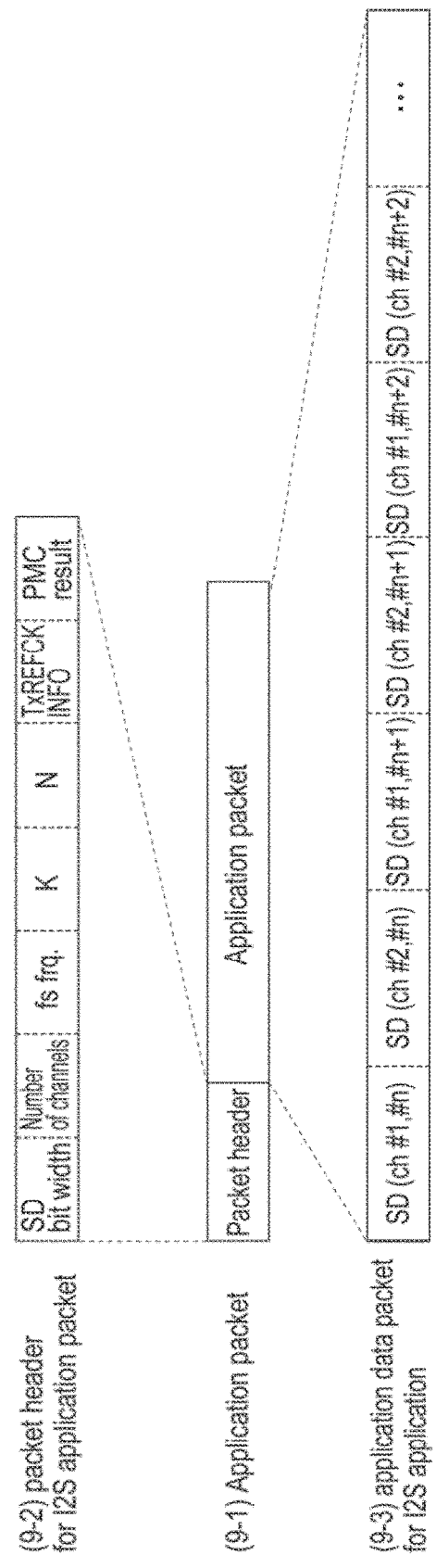

FIG.10A

I2S header

| Byte | Bit(s) | Name | Description |
|---|---|---|---|
| 1 | 7:5 | I2S frame format | 000: I2S format<br>001: Left justified<br>010: Rigth Justified<br>011-111: reserved |
| 1 | 4:3 | I2S data bit width | 00:16 bit<br>01:18 bit<br>10:20 bit<br>11:24 bit |
| 1 | 2:0 | number of stereo | 3 bit integer.<br>THIS NUMBER REPRESENTS NUMBER OF TRANSMISSION CHANNELS. IF THIS NUMBER IS 1, THIS MEANS THAT ONE PIECE OF STEREO (L x R) DATA IS TRANSMITTED. IF THIS NUMBER IS 4, THIS MEANS THAT FOUR PIECES OF STEREO DATA ARE TRANSMITTED. |
| 2 | 7:5 | fs (sampling frequency) | 000: 44.1 kHz<br>001: 48 kHz<br>010: 96 kHz<br>011: 192kHz |
| 2 | 4:0 | K (multiplier to make the audio master clock) | 0x00: 32<br>0x01: 64<br>0x02: 128<br>0x03: 256<br>0x04: 512<br>0x05: 1024 |
| 3 | 7:5 | reserved | |
| 3 | 4:0 | N[12:8] | 13 bit integer<br>RATIO OF DIVISION N OF AUDIO MASTER FREQUENCY Fm (ex 24.576 MHz, 22.5792 MHz)<br>THIS RATIO OF DIVISION DEPENDS ON Fm.<br>IF fm is 24.576MHz, then N is 1536.<br>IF fm is 22.5792MHz, then N is 7056 |
| 4 | 7:0 | N[7:0] | |
| 5 | 7 | reserved | |
| 5 | 6:4 | TxREFCK INFO | 000: 1GHz<br>001: 500MHz<br>010: 250MHz<br>011: reserved<br>100: 125MHz<br>101: 62.5MHz<br>110: 31.25MHz<br>111: else |
| 5 | 3:2 | reserved | |
| 5 | 1:0 | PMC result [17:16] | 18 bit integer<br>THIS NUMBER IS COUNT VALUE OF fm/N (sec) ON BASIS OF TxREFCK (250 MHz).<br>IDEALLY, WHEN fm IS 24.576 MHz, AND N IS 1536, PMC RESULT VALUE IS 15625.<br>WHEN fm IS 22.5792 MHz, AND N IS 7056, PMC RESULT VALUE IS 78125.<br>RECEIVING APPARATUS CAN RECOVER fm FROM PMC RESULT VALUE AND N. |
| 6 | 7:0 | PMC result[15:8] | |
| 7 | 7:0 | PMC result[7:0] | |

FIG. 10B

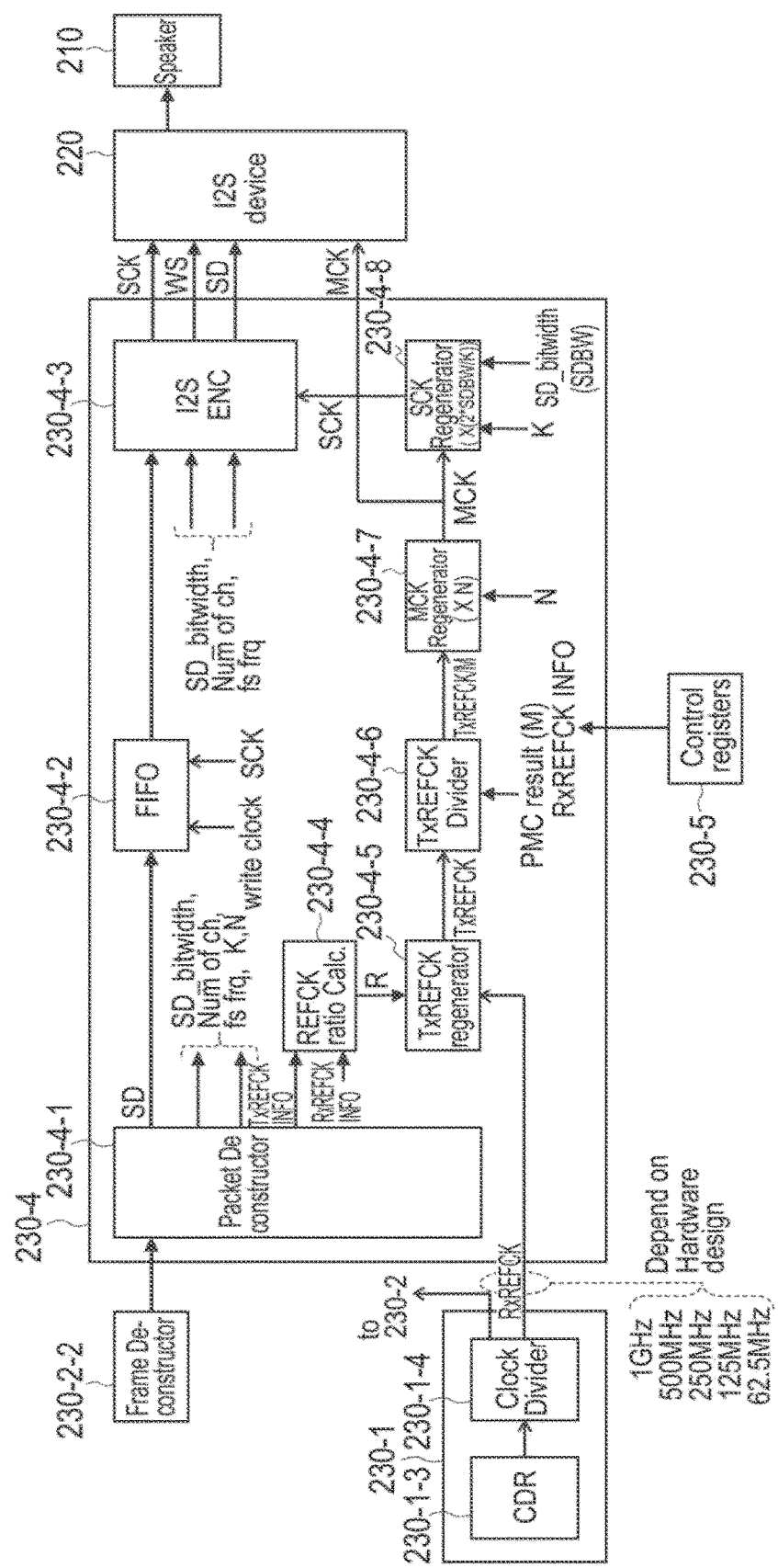
F I G. 12

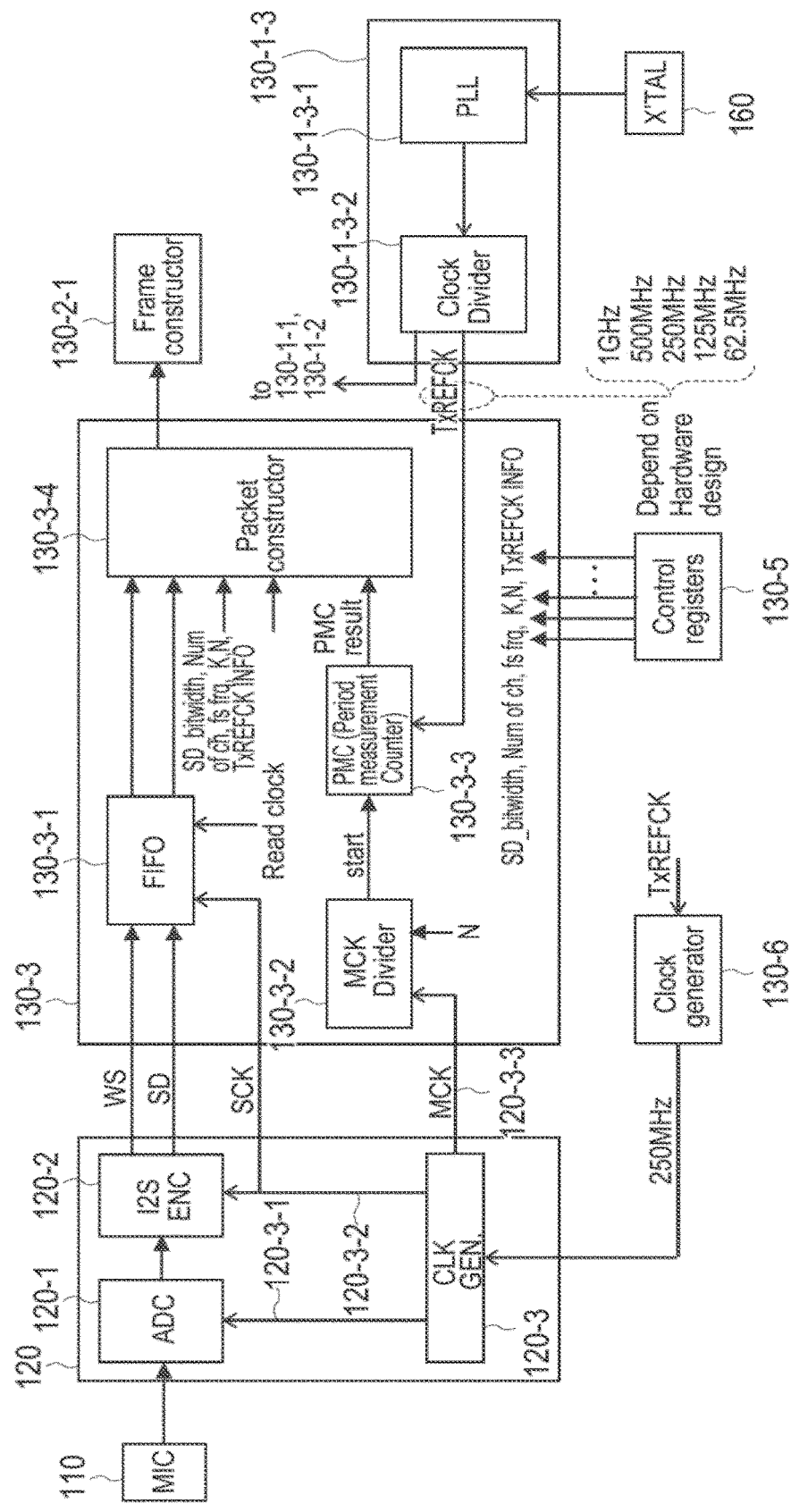
F I G . 1 3

FIG.14

| TxREFCK | [MHz] | 250 |
|---|---|---|
| fs | [kHz] | 50 |
| K | | 512 |
| MCK (K*fs) | [MHz] | 25.6 |
| N | | 64 |
| (Expected) PMC result value (M) | | 625 |

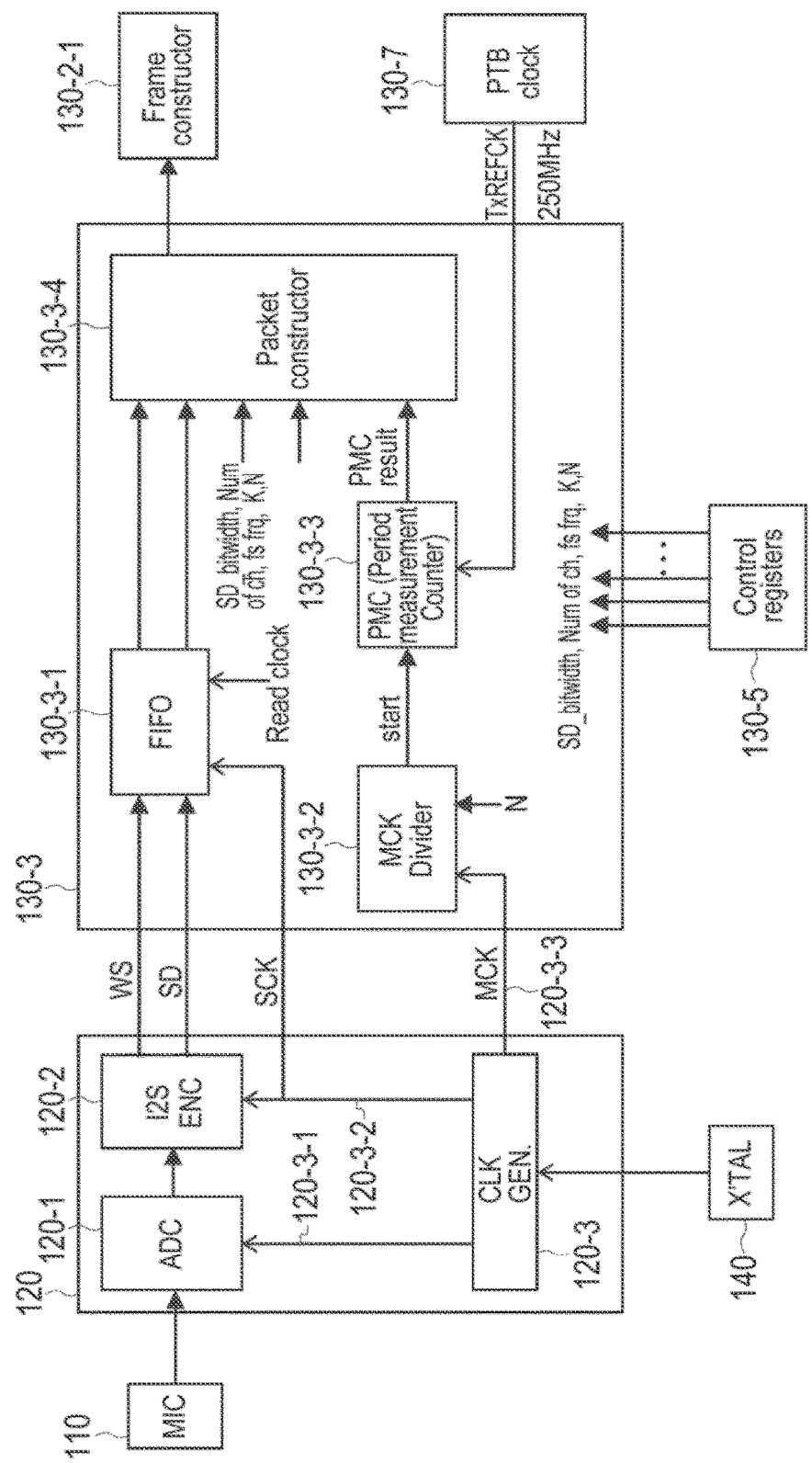
F I G. 15

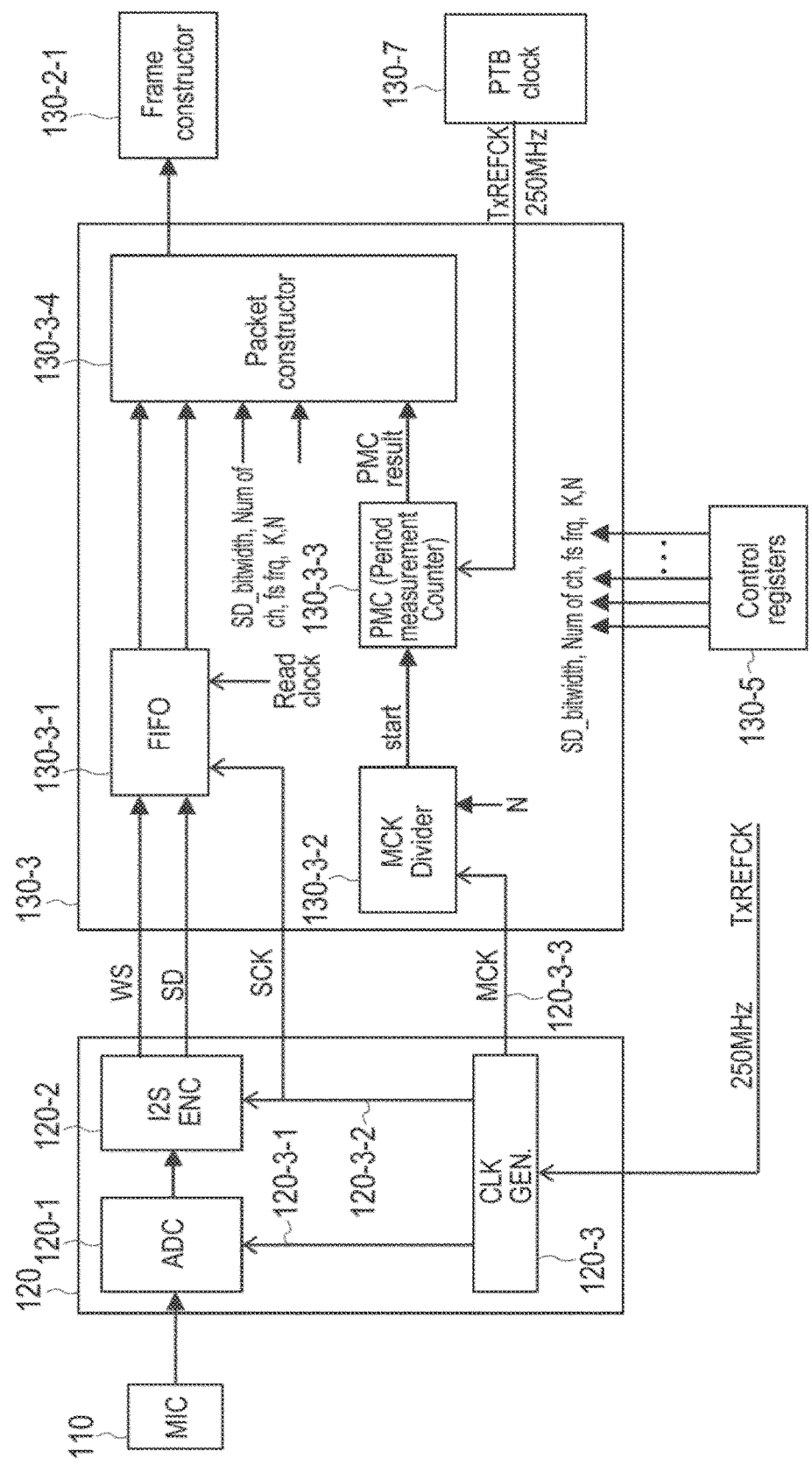
F I G. 17

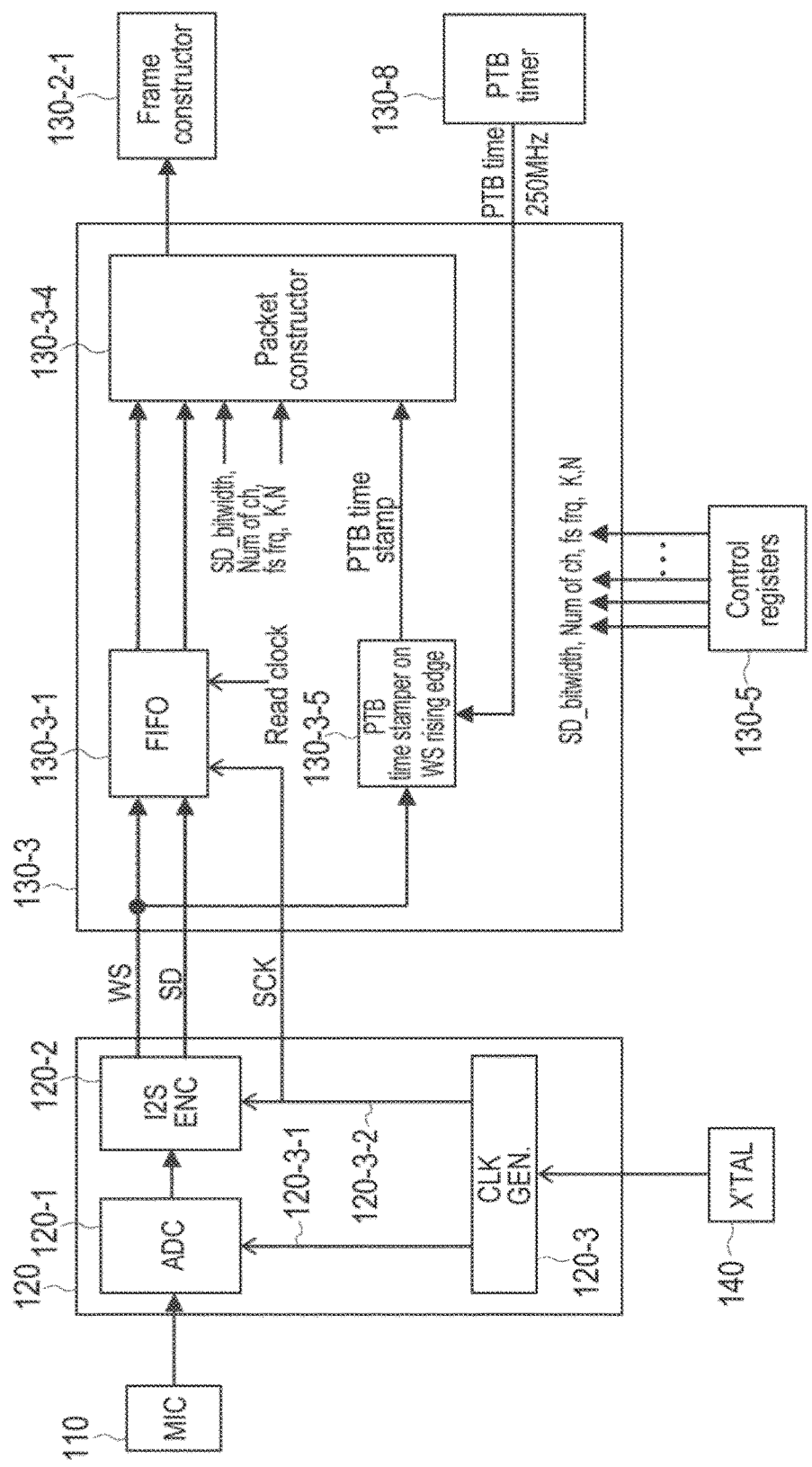
F I G . 1 8

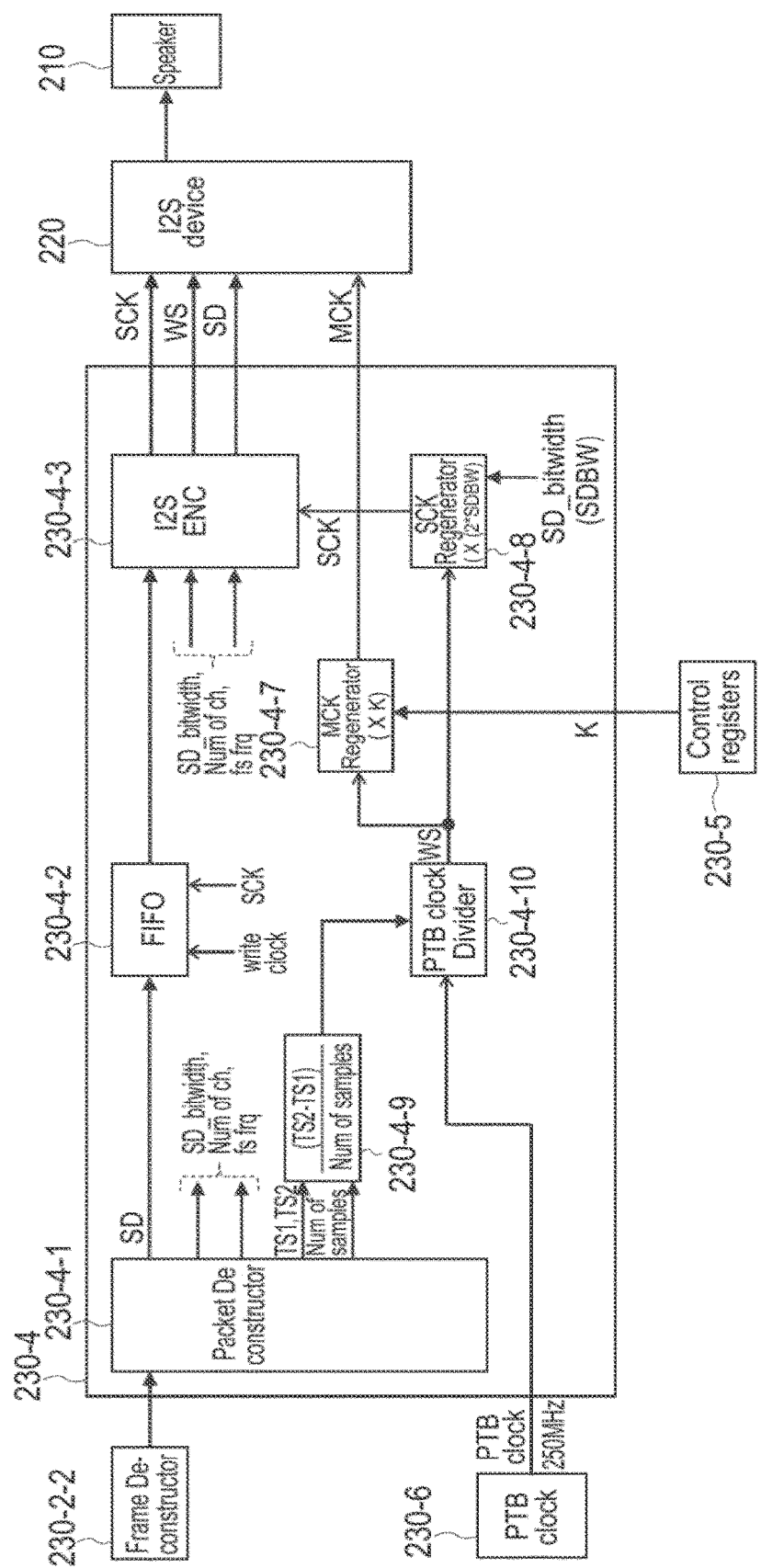
F I G. 2 1

FIG.22A

I2S header

| Byte | Bit(s) | Name | Description |
|---|---|---|---|
| 1 | 7:5 | I2S frame format | 000: I2S format<br>001: Left justified<br>010: Rigth Justified<br>011-111: reserved |
| 1 | 4:3 | I2S data bit width | 00: 16 bit<br>01: 18 bit<br>10: 20 bit<br>11: 24 bit |
| 1 | 2:0 | number of stereo. | 3 bit integer.<br>THIS NUMBER REPRESENTS NUMBER OF TRANSMISSION CHANNELS. IF THIS NUMBER IS 1, THIS MEANS THAT ONE PIECE OF STEREO (L × R) DATA IS TRANSMITTED. IF THIS NUMBER IS 4, THIS MEANS THAT FOUR PIECES OF STEREO DATA ARE TRANSMITTED. |
| 2 | 7:5 | Fs (sampling frequency) | 000: 44.1 kHz<br>001: 48 kHz<br>010: 96 kHz<br>011: 192kHz |
| 2 | 4:0 | reserved | |
| 3 | 7:0 | TS1[23:16] | 24bit integer<br>PTB TIME OF RISING EDGE OF WS SIGNAL OF FIRST SD IN PLURALITY OF PIECES OF SD IN PACKET. |
| 4 | 7:0 | TS1[15:8] | |
| 5 | 7:0 | TS1[7:0] | |
| 6 | 7:0 | TS2[23:16] | 24bit integer<br>PTB TIME OF RISING EDGE OF LAST WS SIGNAL IN PLURALITY OF PIECES OF SD IN PACKET. |
| 7 | 7:0 | TS2[15:8] | |
| 8 | 7:0 | TS2[7:0] | |
| 9 | 7:0 | number of samples[15:8] | 16 bit integer |
| 10 | 7:0 | number of samples[7:0] | THIS REPRESENTS NUMBER OF I2S DATA SAMPLES TRANSMITTED IN THIS PACKET. |

F I G. 22 B

COMMUNICATION APPARATUS AND COMMUNICATION SYSTEM

TECHNICAL FIELD

The present disclosure relates to a communication apparatus and a communication system.

BACKGROUND ART

In a technology having been proposed, a Master SerDes and a Slave SerDes perform high-speed serial communication (see PTL 1).

When audio signals are transmitted between the two SerDeses, signals conforming to the I2 S (Inter-IC Sound) protocol may be transmitted.

CITATION LIST

Patent Literature

[PTL 1]
    JP 2011-239011A

SUMMARY

Technical Problem

However, signals conforming to the I2 S protocol are asynchronous with signals transmitted between two SerDeses, and their frequency bands also are different. In addition, the number of the frequencies of sampling clocks for the audio signals is not necessarily only one, and the frequencies of the sampling clocks are different depending on sound sources, in some cases. It is necessary to make it possible to transmit these audio signals between the two SerDeses and regenerate the audio signals correctly.

In view of this, the present disclosure provides a communication apparatus and a communication system that make it possible to transmit audio signals between communication apparatuses that perform signal transmission asynchronously to the audio signals, and to regenerate the audio signals correctly.

Solution to Problem

In order to solve the problem described above, the present disclosure provides a communication apparatus including a counting section that counts the number of a predetermined reference clock included in one cycle of a divided signal of an audio master clock with a frequency that is equal to a product of a frequency of a sampling clock for sampling of an audio signal and a multiplier on the basis of the audio master clock, a ratio of division of the divided signal and the predetermined reference clock, and a packet generator that generates a packet including information including the number counted at the counting section, a bit width of SD (Serial Data) conforming to an I2 S standard, the frequency of the sampling clock, the ratio of division of the divided signal to the audio master clock, a frequency ratio of the frequency of the audio master clock to the frequency of the sampling clock, and the SD.

The packet generated by the packet generator may include a header portion and a data portion, the header portion may include the number counted at the counting section, the bit width of the SD, the frequency of the sampling clock, the ratio of division, and the frequency ratio, and the data portion may include a plurality of pieces of the SD.

The header portion may include the bit width of the SD, the number of channels of the SD, the frequency of the sampling clock, the ratio of division of the divided signal to the audio master clock, the frequency ratio of the frequency of the audio master clock to the frequency of the sampling clock, a frequency of the reference clock, and the number counted at the counting section.

The data portion may include the SD of all channels and all samples.

The communication apparatus may include a physical layer clock generator that generates a clock to be used in common by physical layers of both the communication apparatus and a communication partner apparatus, and a divider that divides the clock generated at the physical layer clock generator and generates the reference clock.

A frequency of the clock generated at the physical layer clock generator may be 250 MHz.

The frequency of the audio master clock may be 25.6 MHz, and the frequency of the sampling clock may be 50 kHz.

The sampling clock and the audio master clock may be asynchronous with the reference clock.

The sampling clock and the audio master clock may be synchronous with the reference clock.

The communication apparatus may include a PTB clock generator that generates a PTB (Precision Time Base) clock to be used to generate timestamp information to be used in common by the communication apparatus and a communication partner apparatus, in which the reference clock may be the PTB clock.

The audio master clock may be synchronous with the PTB clock.

A frequency of the PTB clock may be 250 MHz.

The present disclosure provides a communication apparatus including a counting section that receives a WS (Word Select) signal conforming to an I2 S standard, and counts, on the basis of a predetermined reference clock used in common by the communication apparatus and a communication partner apparatus, first timing information representing a timing of a logical change of the WS signal in a first piece in a plurality of pieces of SD (Serial Data) included in one packet to be transmitted to the communication partner apparatus, and second timing information representing a timing of a logical change of the WS signal in a last piece in the plurality of pieces of SD, and a packet generator that generates the packet including a bit width of the SD, a frequency of a sampling clock for sampling of an audio signal, the first timing information, the second timing information, the number of the pieces of the SD included in the one packet, and the SD.

The packet generator may generate the packet including information regarding the number of channels of the SD.

The present disclosure provides a communication apparatus including a recovering section that receives a packet transmitted from a communication partner apparatus, and recovers, from the packet, SD (Serial Data) conforming to an I2 S standard, a bit width of the SD, a frequency of a sampling clock for sampling of an audio signal, a frequency ratio of a frequency of an audio master clock to the frequency of the sampling clock, the number of a predetermined first reference clock included in one cycle of a divided signal of the audio master clock, the frequency of the sampling clock, and a ratio of division of the divided signal to the audio master clock, an audio master clock regenerator that regenerates the audio master clock on the basis of the number of the first reference clock, a frequency of the first reference clock and the ratio of division, and an SCK regenerator that regenerates an SCK (Serial Clock) on the basis of bit width information regarding the SD, the frequency ratio and the audio master clock.

The communication apparatus may include a clock regenerating circuit that generates a second reference clock synchronous with a signal change of the SD on the basis of the packet, and a frequency ratio calculating section that calculates a frequency ratio between the frequency of the first reference clock and the frequency of the second reference clock, in which the audio master clock regenerator regenerates the audio master clock on the basis of the number of the first reference clock, frequency information regarding the first reference clock, the ratio of division and the frequency ratio calculated at the frequency ratio calculating section.

The communication apparatus may include a PTB clock generator that generates a PTB (Precision Time Base) clock to be used to generate timestamp information to be used in common by the communication apparatus and the communication partner apparatus, in which the first reference clock may be the PTB clock.

The present disclosure provides a communication apparatus including a recovering section that receives a packet transmitted from a communication partner apparatus, and recovers, from the packet, SD (Serial Data) conforming to an I2 S standard, bit width information regarding the SD, frequency information regarding an SCK (Serial Clock), first timing information representing a timing of a first logical change of a WS (Word Select) signal included in the one packet, second timing information representing a timing of a last logical change of the WS signal, and the number of pieces of the SD included in the one packet, a clock generator that generates a reference clock to be used in common by the communication apparatus and the communication partner apparatus, a WS signal regenerator that regenerates the WS signal on the basis of the first timing information, the second timing information, the number of the pieces of the SD and the reference clock, an audio master clock regenerator that regenerates an audio master clock with a frequency that is equal to a product of a frequency of the WS signal regenerated at the WS signal regenerator and a multiplier, and an SCK regenerator that regenerates the SCK on the basis of the WS signal regenerated at the WS signal regenerator and the bit width information regarding the SD.

The communication apparatus may include a PTB clock generator that generates a PTB (Precision Time Base) clock to be used to generate timestamp information to be used in common by the communication apparatus and a communication partner apparatus, in which the reference clock may be the PTB clock.

The packet may be transmitted in a period allocated by TDD (Time Division Duplex).

The present disclosure provides a communication system including a first communication apparatus, and a second communication apparatus that performs serial communication with the first communication apparatus, in which the first communication apparatus has a counting section that counts the number of a predetermined reference clock included in one cycle of a divided signal of an audio master clock with a frequency that is equal to a product of a frequency of a sampling clock for sampling of an audio signal and a multiplier on the basis of the audio master clock, a ratio of division of the divided signal and the predetermined reference clock, and a packet generator that generates a packet including information including the number counted at the counting section, a bit width of SD (Serial Data) conforming to an I2 S standard, the frequency of the sampling clock, the ratio of division of the divided signal to the audio master clock, a frequency ratio of the frequency of the audio master clock to the frequency of the sampling clock, and the SD, and the second communication apparatus has a recovering section that receives the packet transmitted from the first communication apparatus, and recovers, from the packet, the SD, the bit width of the SD, the frequency of the sampling clock, the frequency ratio of the frequency of the audio master clock to the frequency of the sampling clock, the number of a predetermined first reference clock included in one cycle of the divided signal of the audio master clock, the frequency of the sampling clock, and the ratio of division of the divided signal to the audio master clock, an audio master clock regenerator that regenerates the audio master clock on the basis of the number of the first reference clock, a frequency of the first reference clock and the ratio of division, and an SCK regenerator that regenerates an SCK (Serial Clock) on the basis of bit width information regarding the SD, the frequency ratio and the audio master clock.

The present disclosure provides a communication system including a first communication apparatus, and a second communication apparatus that performs serial communication with the first communication apparatus, in which the first communication apparatus has a counting section that receives a WS (Word Select) signal conforming to an I2 S standard, and counts, on the basis of a predetermined reference clock used in common by the first communication apparatus and the second communication apparatus, first timing information representing a timing of a logical change of the WS signal in a first piece in a plurality of pieces of SD (Serial Data) included in one packet to be transmitted to the second communication apparatus, and second timing information representing a timing of a logical change of the WS signal in a last piece in the plurality of pieces of SD, and a packet generator that generates the packet including a bit width of the SD, a frequency of a sampling clock for sampling of an audio signal, the first timing information, the second timing information, the number of the pieces of the SD included in the one packet, and the SD, and the second communication apparatus includes a recovering section that receives the packet transmitted from the second communication apparatus, and recovers, from the packet, SD (Serial Data) conforming to an I2 S standard, bit width information regarding the SD, frequency information regarding an SCK (Serial Clock), first timing information representing a timing of a first logical change of a WS (Word Select) signal included in the one packet, second timing information representing a timing of a last logical change of the WS signal, and the number of pieces of the SD included in the one packet, a clock generator that generates a reference clock to be used in common by the second communication apparatus and the first communication apparatus, a WS signal regenerator that regenerates the WS signal on the basis of the first timing information, the second timing information, the number of the pieces of the SD and the reference clock, an audio master clock regenerator that regenerates an audio master clock with a frequency that is equal to a product of a frequency of the WS signal regenerated at the WS signal regenerator and a multiplier, and an SCK regenerator that regenerates the SCK on the basis of the WS signal regenerated at the WS signal regenerator and the bit width information regarding the SD.

BRIEF DESCRIPTION OF DRAWINGS

FIG. 1 is a block diagram depicting a basic configuration of a communication system 1.

FIG. 4 is a block diagram depicting a schematic configuration of a communication system including communication apparatuses according to a first embodiment.

FIG. 6 is a block diagram depicting an internal configuration of an transmitter-side I2 S device, and an encapsulator and a PHY clock generator in the SerDes.

FIG. 8 is a figure depicting transmission parameters to be used to regenerate an MCK on a receiver side.

FIG. 9 is a configuration diagram of an application packet generated at the SerDes.

FIG. 10A is a figure depicting a configuration of a header (I2 S header) of an application packet for I2 S signal transmission.

FIG. 10B is a figure depicting a configuration of data and a CRC of the application packet for I2 S signal transmission.

FIG. 12 is a block diagram depicting an internal configuration of a deencapsulator in a SerDes.

FIG. 13 is a block diagram depicting the internal configuration of the I2 S device, and the encapsulator and the PHY clock generator in the SerDes according to a second embodiment.

FIG. 14 is a figure depicting values of parameters to be used when the SerDes according to the second embodiment regenerates an MCK.

FIG. 15 is a block diagram depicting the internal configuration of the encapsulator in the SerDes according to a third embodiment.

FIG. 17 is a block diagram depicting the internal configuration of the I2 S device and the encapsulator in the SerDes according to a fourth embodiment.

FIG. 18 is a block diagram depicting the internal configuration of the I2 S device and the encapsulator in the SerDes according to a fifth embodiment.

FIG. 21 is a block diagram depicting the internal configuration of the deencapsulator in the SerDes according to the fifth embodiment.

FIG. 22A is a figure depicting the configuration of the header of an application packet for I2 S signal transmission.

FIG. 22B is a figure depicting the configuration of data and a CRC of the application packet for I2 S signal transmission.

DESCRIPTION OF EMBODIMENTS

Hereinbelow, embodiments of a communication apparatus, a communication system, and a communication method are explained with reference to the figures. Whereas major constituent portions of the communication apparatus and the communication system are mainly explained hereinbelow, there can be undepicted or unexplained constituent portions or functionalities in the communication apparatus and the communication system. The following explanation does not exclude undepicted or unexplained constituent portions or functionalities.

(Basic Configuration of Communication System)

FIG. 1 is a block diagram depicting a basic configuration of a communication system 1 in which signals conforming to the I2 S protocol are transmitted and received between two SerDeses 130 and 230. The communication system 1 in FIG. 1 includes a first communication module 100 and a second communication module 200 each having a SerDes that performs high-speed serial communication. The first communication module 100 and the second communication module 200 are connected by a cable 300 with a length of several meters to several dozen meters.

For example, the first communication module 100 and the second communication module 200 can transmit audio signals by using I2 S which is an inter-IC audio signal transmission protocol specified by an FPD-LINK standard, which is one of vehicle-mounted high-speed interface technologies.

Figure 2A:
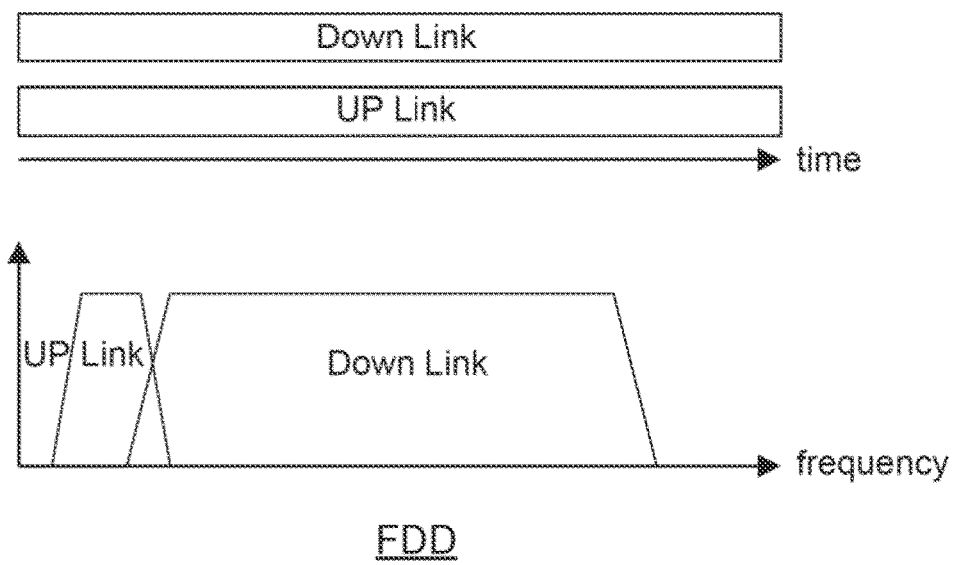
FIG. 2A is a figure for explaining frequency division multiplexing.
Figure 2B:
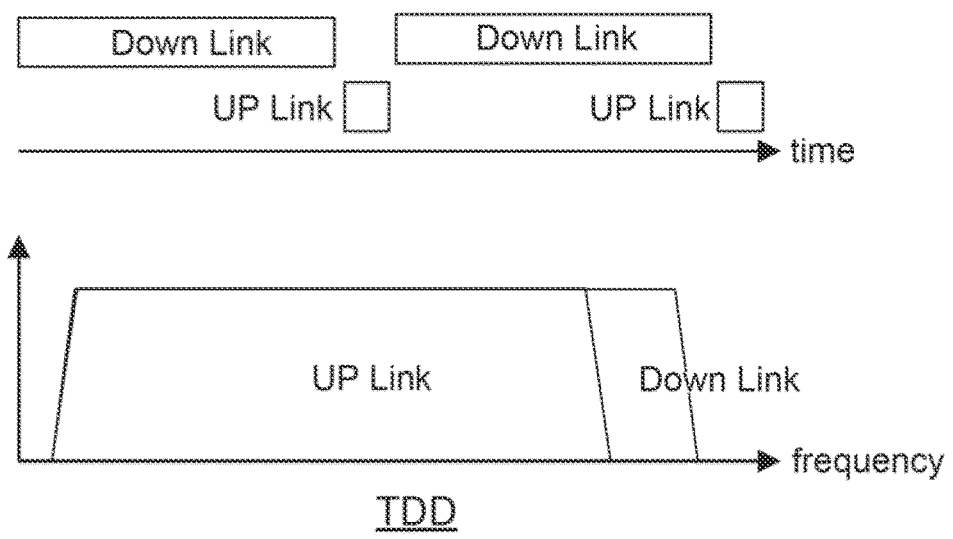
FIG. 2B is a figure for explaining time division multiplexing.

Currently, the Automotive SerDes Alliance (ASA) which is a vehicle-mounted high-speed serial interface standardization body is working on standardization of a vehicle-mounted high-speed serial interface technology. The difference between FPD-LINK and ASA is that, while FPD-LINK uses frequency division multiplexing like the one depicted in FIG. 2A as a method for realizing bidirectional communication, ASA uses time division multiplexing TDD (Time Division Duplex) like the one depicted in FIG. 2B.

The first communication module 100 depicted in FIG. 1 has a microphone 110, a first I2 S device (I2 S audio device) 120, a SerDes (SerDes device) 130, an X'tal 140, a camera 150, and an X'tal 160. The second communication module 200 has a speaker (SPK) 210, an I2 S device (I2 S audio device) 220, a SerDes (SerDes device) 230, a video decoder 250, and an ADAS/ADS processor 260.

A sound signal (audio signal) obtained by sound-collection at the microphone 110 in the first communication module 100 is input to the I2 S device 120. The I2 S device 120 has an ADC 120-1, an I2 S encoder (I2 S ENC) 120-2, and a clock generator (CLK GEN) 120-3.

The clock generator 120-3 generates an audio sampling clock, an audio serial clock, and an audio master clock (hereinafter, an MCK) in synchronization with a reference clock generated at the X'tal 140.

The ADC 120-1 performs AD conversion of the audio signal from the microphone 110 in synchronization with the audio sampling clock and generates audio data. The I2 S encoder 120-2 encodes the audio data in synchronization with the audio serial clock, and generates an SCK (Serial Clock), a WS (Word Select) signal, and SD (Serial Data)

conforming to the I2 S protocol. In the present specification, an SCK, a WS, and SD are collectively referred to as an I2 S signal, in some cases.

The SCK, the WS signal, the SD, and the MCK generated at the I2 S device 120 are input to the SerDes 130. In addition, video data obtained by image-capturing at the camera 150 and a reference clock generated at the X'tal 160 are input to the SerDes 130.

The SerDes 130 generates a packet including the audio data according to the audio signal obtained by sound-collection at the microphone 110 and transmits the packet to the SerDes 230 via the cable 300. The packet is transmitted in a period allocated by TDD. The SerDes 230 receives the packet transmitted from the SerDes 130, recovers the original SCK, WS signal, SD, and MCK, and recovers the video data obtained by image-capturing at the camera 150.

The SCK, WS signal, SD, and MCK recovered at the SerDes 230 are input to the I2 S device (I2 S audio device) 220. The I2 S device 220 has an I2 S decoder (I2 S DEC) 220-1, a DAC 220-2, and a clock divider (CLK divider) 220-3.

The clock divider 220-3 generates an audio sampling clock and an audio serial clock in synchronization with the MCK regenerated at the SerDes 230. The I2 S decoder 220-1 recovers the original audio data in synchronization with the audio serial clock. The recovered audio data is supplied to the DAC 220-2 and the ADAS/ADS processor 260. The DAC 220-2 performs DA conversion of the audio data to generate an audio signal and inputs the audio signal to the speaker 210. Thereby, the audio signal obtained by sound-collection at the microphone 110 is regenerated from the speaker 210. The ADAS/ADS processor 260 performs analysis or the like of the audio data and uses results thereof for recognition of the surrounding environment, for example.

As mentioned above, in the communication system 1 depicted in FIG. 1, the audio signal obtained by sound-collection at the microphone 110 in the first communication module 100 is subjected to AD conversion at the I2 S device 120, thereafter the audio signal is converted into a signal conforming to the I2 S protocol, the signal is packetized in a SerDes transmission format at the SerDes 130, and the packet is transmitted to the second communication module 200. The SerDes 230 in the second communication module 200 recovers the I2 S SCK, WS signal, SD, and MCK from the received packet. The I2 S device 220 performs conversion which is inverse to the conversion performed at the I2 S device 120, recovers the audio signal, and outputs the audio signal as a sound at the speaker 210. In addition, the I2 S device 220 supplies the audio data in an I2 S format to the ADAS/ADS processor 260.

(I2 S Format)

Figure 3:
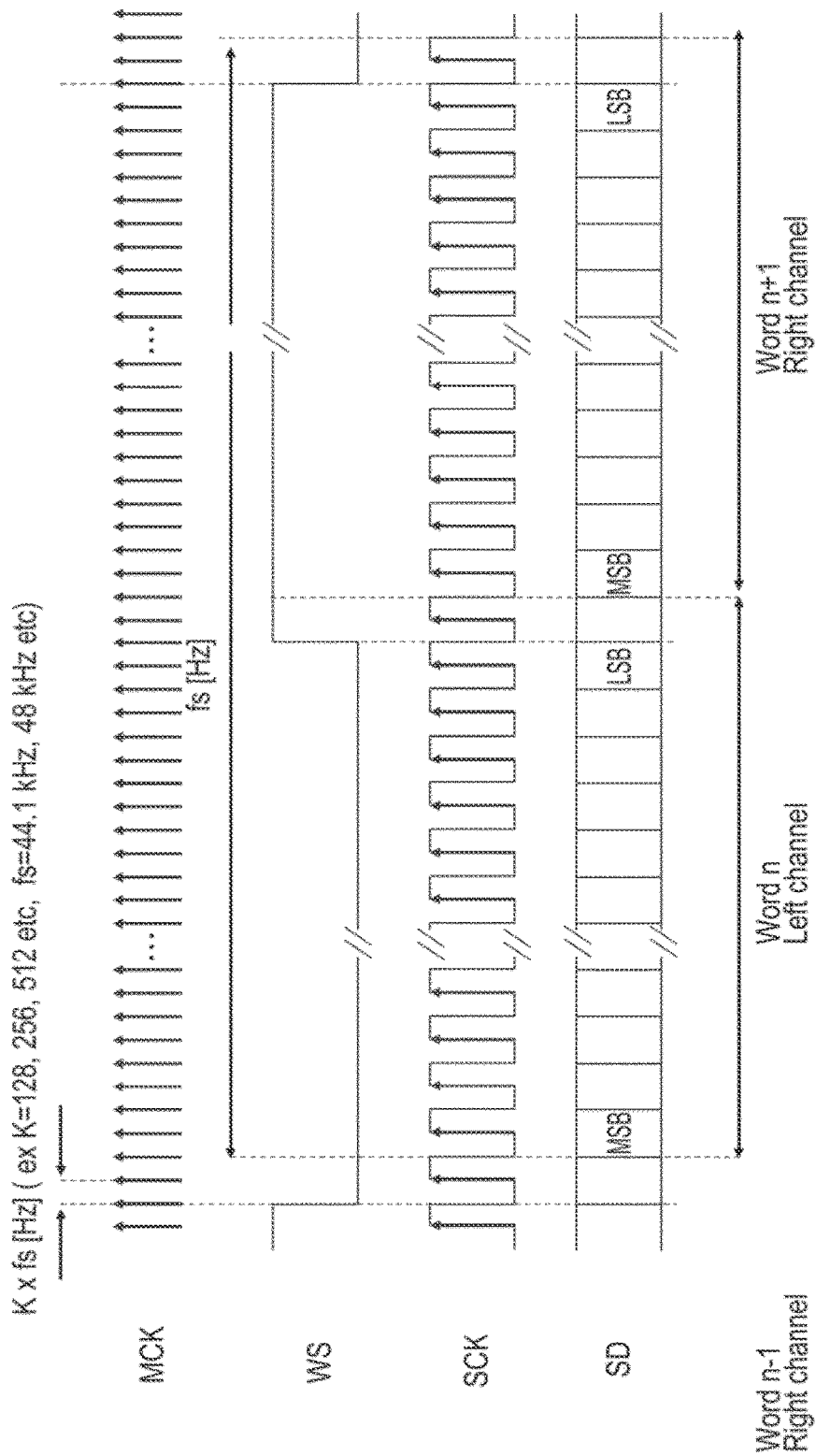
FIG. 3 is a figure depicting an I2 S format.

FIG. 3 is a figure depicting an I2 S format. FIG. 3 depicts signal waveforms of an MCK, a WS signal, an SCK, and SD. The MCK has a frequency which is equal to the product of the frequency fs [Hz] of a sampling clock and a multiplier K. The multiplier K is 128, 256, or 512, for example. The WS signal is a signal with a frequency fs which is the same as the frequency of the sampling clock. One cycle of the WS signal is an SD bit width. The SD bit width in one cycle of the WS signal can be any width. The frequency of the SCK changes depending on the SD bit width. The SCK is a clock that specifies a timing at which the serial transmission of each bit in the SD is performed.

FIG. 3 depicts an example in which left-channel serial data is transmitted in a low-level period of a WS signal, and right-channel serial data is transmitted in a high-level period of the WS signal. The SD is transmitted bit by bit in order from the side of an MSB.

Typically, an audio master clock MCK with a frequency which is equal to the product of a sampling frequency fs and the multiplier K is used in a digital sound process. Accordingly, as depicted in FIG. 3, an MCK also is transmitted in addition to a WS signal, an SCK, and SD, in some cases. The I2 S device 120 in FIG. 1 generates a WS signal, an SCK and SD in synchronization with an MCK. Therefore, what is important when transmitting an audio signal is that a transmitter-side MCK is regenerated accurately on the receiver side, especially with less jitter. This is because if a sampling clock including jitter is used when a digital signal is converted into an audio signal at the DAC 220-2 on the receiver side, a modulation distortion in the time direction occurs, and this results in deterioration of the sound quality (S/N), undesirably.

In recent years, audio equipment that provides high sound quality is widely used, and high dynamic range signals are transmitted at high sampling clock frequencies. Accordingly, requirements regarding clock jitter on the regeneration side have been becoming more rigorous. High-quality transmission of audio signals by using a high-speed serial interface technology requires accurate transmission of an MCK with a frequency which is the same as the frequency fs of a sampling clock or is equal to an integer multiple of the frequency fs. However, frequencies used for a high-speed serial interface technology adopted for the SerDes 130 and 230 and the like are frequencies unrelated to the frequencies of sampling clocks (44.1 kHz, 48 kHz, 96 kHz, 192 kHz, etc.) or MCKs (22.5792 MHz, 24.576 MHz, etc.) used in typical audio signal processing. Even if the frequency of a sampling clock used in audio signal processing and a frequency used at a high-speed serial interface are asynchronous with each other, it is necessary to make it possible to regenerate an audio signal transmitted via the high-speed serial interface correctly at the destination of the transmission. However, existing high-speed serial transmission protocols such as FPD-LINK mentioned above do not clearly stipulate a specific procedure for the serial transmission of asynchronous audio signals.

Communication apparatuses and the communication system 1 according to the present disclosure explained below are characterized in that audio signals conforming to the I2 S standard can be transmitted and regenerated correctly in a high-speed serial interface technology, for example, in the ASA standard.

First Embodiment

FIG. 4 is a block diagram depicting the schematic configuration of the communication system 1 including communication apparatuses according to a first embodiment. Constituent portions in FIG. 4 that are the same as their counterparts in FIG. 1 are given identical reference signs, and differences are mainly explained below. In addition, in FIG. 4, the flow of signal processing of an I2 S signal is represented by arrow lines.

The communication system 1 in FIG. 4 includes a first communication module (first communication apparatus) 10 and a second communication module (second communication apparatus) 20.

The first communication module 10 has the microphone 110, the I2 S device 120, the SerDes 130, and the X'tal 160. The second communication module 20 includes the speaker 210, the I2 S device 220, and the SerDes 230.

The SerDes 130 is a PHY clock master. That is, the SerDes 130 generates a PHY clock used on the physical layer of the SerDes 130 on the basis of the X'tal 160. On the other hand, the SerDes 230 is a PHY clock follower that operates in synchronization with the PHY clock generated at the SerDes 130. More specifically, the SerDes 130 generates transmission symbols for Down Link by using the PHY clock as a symbol clock, and transmits the transmission symbols to the SerDes 230 via the cable 300. The SerDes 230 regenerates the PHY clock from the received transmission symbols, and decodes the received transmission symbols by using the regenerated PHY clock. Here, a transmission symbol corresponds to the minimum unit of a transmission signal changing interval. The minimum unit is an interval during which one bit is transmitted per one transmission symbol in a case of PAM (Pulse Amplitude Modulation) 2, and is an interval during which two bits are transmitted in a case of PAM4.

As depicted in FIG. 4, the SerDes 130 has a PHY block 130-1, a LINK block 130-2, an encapsulator (Application System Encapsulator) 130-3, a deencapsulator (Application System Deencapsulator) 130-4, and control registers 130-5. The encapsulator 130-3 and the deencapsulator 130-4 are provided for each application such as I2 S signal transmission. In the present specification and the figures, the encapsulator 130-3 and the deencapsulator 130-4 for I2 S signal transmission are mainly explained.

The PHY block 130-1 has a Down Link transmitting section (Down Link Tx) 130-1-1, a PHY clock generator (CLK GEN) 130-1-3, and an UP Link receiving section (UP Link Rx) 130-1-2. The LINK block 130-2 has a frame constructor 130-2-1, an OAM (Operation Application Maintenance) section 130-2-3, and a frame deconstructor 130-2-2.

(Packet and Frame Configuration)

Figure 5:
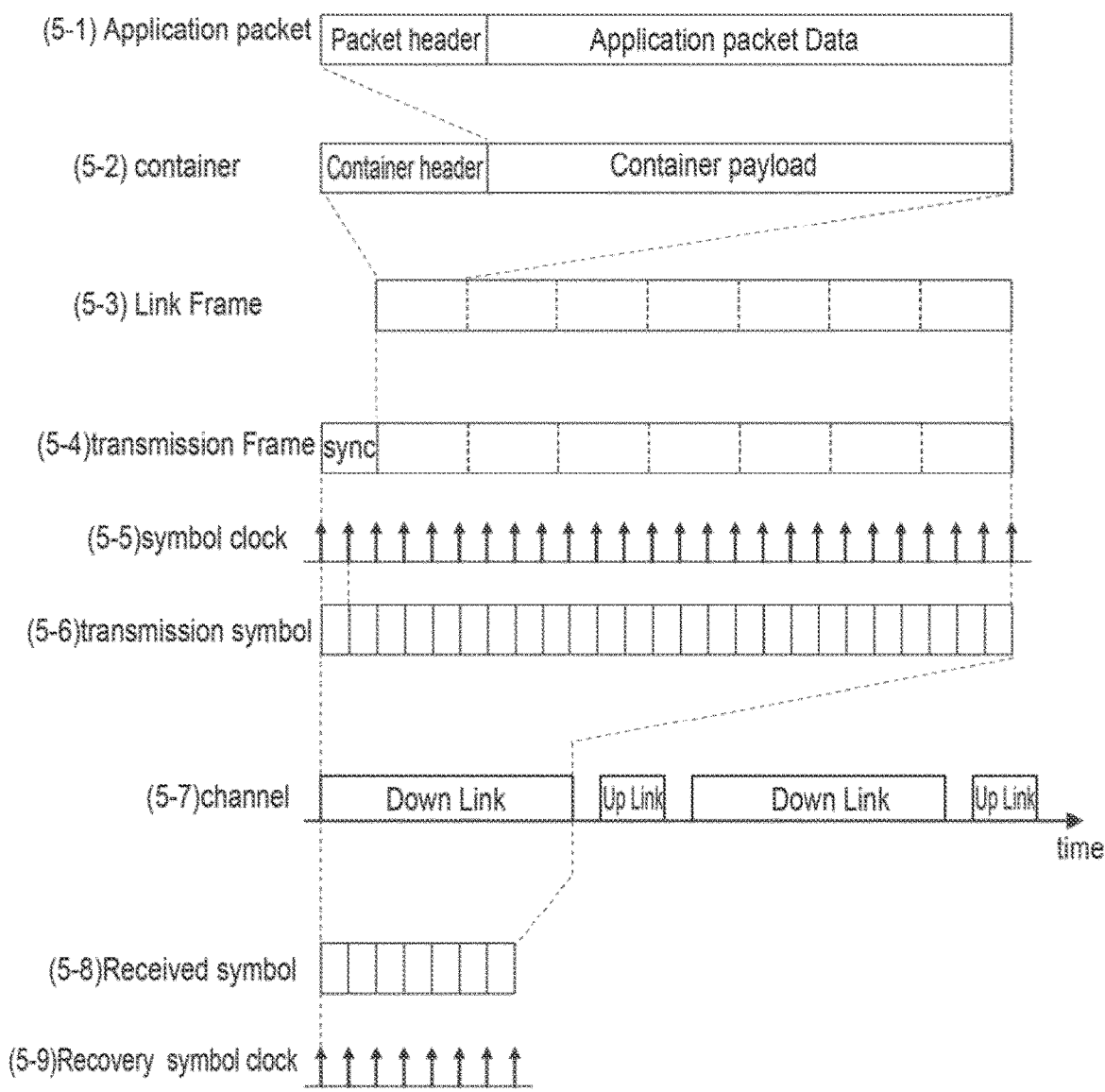
FIG. 5 is a figure depicting the configuration of a packet and frames generated in a SerDes in FIG. 4.

FIG. 5 is a figure depicting the configuration of a packet and frames generated in the SerDes 130 in FIG. 4. The encapsulator 130-3 in FIG. 4 packetizes a signal from an application such as the microphone 110 or the camera 150 in order to transmit an audio signal from the microphone 110, a video signal from the camera 150, or the like, and generates an application packet by adding a header to the packet ((5-1) in FIG. 5). The application packet generated by the encapsulator 130-3 is sent to the frame constructor 130-2-1 in the LINK block 130-2.

The OAM section 130-2-3 in the LINK block 130-2 generates information obtained by monitoring the control or transmission state of the SerDes 130, and includes the information in the application packet. The frame constructor 130-2-1 generates a container including a container header ((5-2) in FIG. 5), and further generates a Link frame into which a plurality of containers is put together ((5-3) in FIG. 5). A container includes a plurality of application packets. A container header includes, for each of the plurality of application packets, the address of the SerDes 130 itself, the address of the connection-destination SerDes 230, the receiver of the application packet, content information regarding the application packet, and the like.

The Link frame generated by the frame constructor 130-2-1 is sent to the Down Link transmitting section 130-1-1 in the PHY block 130-1. Processes by the LINK block 130-2 use a clock with a predetermined frequency synchronous with a symbol clock generated at the PHY clock generator 130-1-3 in the PHY block 130-1.

The Down Link transmitting section 130-1-1 in the PHY block 130-1 adds, to the Link frame, a synchronization signal having a special pattern, and generates a transmission frame ((5-4) in FIG. 5).

On the other hand, the PHY clock generator 130-1-3 in the PHY block 130-1 generates a symbol clock ((5-5) in FIG. 5) with a transmission symbol rate (e.g., 2 GHz, 4 GHz, 8 GHz, etc.) of a transmission signal generated in synchronization with a reference clock generated at the X'tal 160, and supplies the symbol clock to the Down Link transmitting section 130-1-1.

The Down Link transmitting section 130-1-1 converts the transmission frame into transmission symbols ((5-6) in FIG. 5) in synchronization with the symbol clock, and transmits the transmission symbols to the transmission cable 300 ((5-7) in FIG. 5).

Next, a reception process by the receiver-side SerDes 230 is explained. The SerDes 230 in FIG. 4 has a PHY block 230-1, a LINK block 230-2, an encapsulator (Application Stream Encapsulator) 230-3, a deencapsulator (Application Stream Deencapsulator) 230-4, and control registers 230-5.

The PHY block 230-1 has an UP Link transmitting section (UP Link Tx) 230-1-1, a Down Link receiving section (Down Link Rx) 230-1-2, a CDR (Clock Data Recovery) 230-1-3, and a clock divider 230-1-4.

Upon reception of the transmission symbols, the Down Link receiving section 230-1-2 sends the received transmission symbols to the CDR 230-1-3. The CDR 230-1-3 extracts change points of the signal level of the received transmission symbols, and regenerates a symbol clock synchronous with the transmission symbol rate ((5-9) in FIG. 5). The CDR 230-1-3 sends the regenerated symbol clock to the Down Link receiving section 230-1-2 and the clock divider 230-1-4.

The Down Link receiving section 230-1-2 assesses the reception level of the transmission symbols received at appropriate timings in synchronization with the symbol clock regenerated at the CDR 230-1-3. Thereby, the Down Link receiving section 230-1-2 can correctly receive the transmission symbols. The Down Link receiving section 230-1-2 recovers the transmission frame from the transmission symbols. In addition, the Down Link receiving section 230-1-2 identifies the position of the following Link frame by using, as a clue, the synchronization signal (sync) added to the transmission frame.

The clock divider 230-1-4 generates an appropriate symbol clock for an UP Link transmission process by the SerDes 230. The frequency of the symbol clock generated by the clock divider 230-1-4 is 2 GHz or 4 GHz, for example. The clock divider 230-1-4 generates the symbol clock for UP Link in synchronization with the symbol clock of Down Link regenerated at the CDR 230-1-3, and supplies the symbol clock for UP Link to the UP Link transmitting section. In addition, the clock divider 230-1-4 supplies, to the LINK block 230-2, a clock with an appropriate frequency used for a Link frame process at the LINK block 230-2.

The LINK block 230-2 has a frame deconstructor 230-2-2, an OAM section (OAM) 230-2-3 and a frame constructor 230-2-1.

The frame deconstructor 230-2-2 decodes the container header of each container ((5-2) in FIG. 5) included in the Link frame ((5-3) in FIG. 5) input from the Down Link receiving section 230-1-2, and sends the container payload to the OAM section 230-2-3 if the container is for the OAM section 230-2-3, and sends the container payload to the deencapsulator 230-4 corresponding to an application if the container is for the application.

The deencapsulator 230-4 decodes the packet header of an application packet ((5-1) in FIG. 5) corresponding to the container payload sent from the frame deconstructor 230-2-2, determines the content of the following application packet, performs an appropriate process, and recovers an application signal before transmission (an I2 S signal in the case depicted in FIG. 4). The recovered application signal is sent to a corresponding application. In the case depicted in FIG. 4, the recovered I2 S signal is sent to the I2 S device 220. The I2 S device 220 recovers the audio signal from the I2 S signal and regenerates a sound from the speaker 210.

The signal processing explained thus far is signal processing in which an audio signal obtained by sound-collection at the microphone 110 is converted in accordance with the I2 S protocol at the I2 S device 120 to generate an application packet, the generated application packet is transmitted from the SerDes 130 to the SerDes 230, an I2 S signal is recovered in the SerDes 230, the audio signal is recovered from the I2 S signal at the I2 S device 220, and the sound is output from the speaker 210.

On the other hand, it is also possible to generate an application packet at the SerDes 230 on the basis of a signal from an application connected to the SerDes 230, transmit the application packet to the SerDes 130 through UP Link in a procedure opposite to the procedure described above, and regenerate the signal at an application connected to the SerDes 130.

At this time, symbol clocks used in a process by the UP Link transmitting section 230-1-1 in the SerDes 230 are synchronous with symbol clocks ((5-9) in FIG. 5) regenerated at the Down Link receiving section 230-1-2 and the CDR 230-1-3. By doing so, symbol clocks of Down Link and UP Link between the SerDes 130 and the SerDes 230 are in a synchronous relation relative to the PHY clock generator 130-1-3 in the SerDes 130, and the UP Link receiving section 130-1-2 in the SerDes 130, which is the receiver side of UP Link, can receive an UP Link signal from the SerDes 230 easily due to an UP Link symbol clock generated at the PHY clock generator 130-1-3.

(Details of Transmitter Side)

FIG. 6 is a block diagram depicting the internal configuration of the transmitter-side I2 S device 120, and the encapsulator 130-3 and the PHY clock generator 130-1-3 in the SerDes 130.

The I2 S device 120 depicted in FIG. 6 has the ADC 120-1, the I2 S encoder 120-2 and the clock generator 120-3, similarly to the I2 S device 120 in FIG. 1. The clock generator 120-3 generates an audio sampling clock, an audio serial clock and an audio master clock MCK in synchronization with a reference clock generated at the X'tal 140.

The encapsulator 130-3 in FIG. 6 corresponds to the I2 S device 120, and has an FIFO 130-3-1, an MCK divider 130-3-2, a PMC (Period Measurement Counter) 130-3-3, and a packet constructor 130-3-4.

The PHY clock generator 130-1-3 has a PLL circuit 130-1-3-1 and a clock divider 130-1-3-2. A reference clock generated at the X'tal 160 is input to the PHY clock generator 130-1-3. The PLL circuit 130-1-3-1 generates a clock synchronous with the reference clock generated at the X'tal 160. The clock divider 130-1-3-2 divides the clock generated by the PLL circuit 130-1-3-1, and generates a PHY clock. The PHY clock is used as a reference clock for transmitting the MCK, in addition to being used in internal processes by the Down Link transmitting section 130-1-1, the UP Link receiving section 130-1-2, and the LINK block 130-2. In FIG. 6, the PHY clock generated at the PHY clock generator 130-1-3 is referred to as a reference clock TxREFCK.

Typically, although this depends on individual manners of implementation, symbol rates of signals transmitted in a Down Link and an UP Link are standardized, and the standardized symbol rates are 2 GHz, 4 GHz, 6 GHz, and 8 GHz, for example, corresponding to transmission speeds. One GHz, 500 MHz, 250 MHz, 125 MHz, 62.5 MHz, and the like that are in a frequency division relation with these symbol rates can be generated easily. Accordingly, in an example explained in the present embodiment, any one of 1 GHz, 500 MHz, 250 MHz, 125 MHz, and 62.5 MHz is used as the reference clock TxREFCK.

Figure 7:
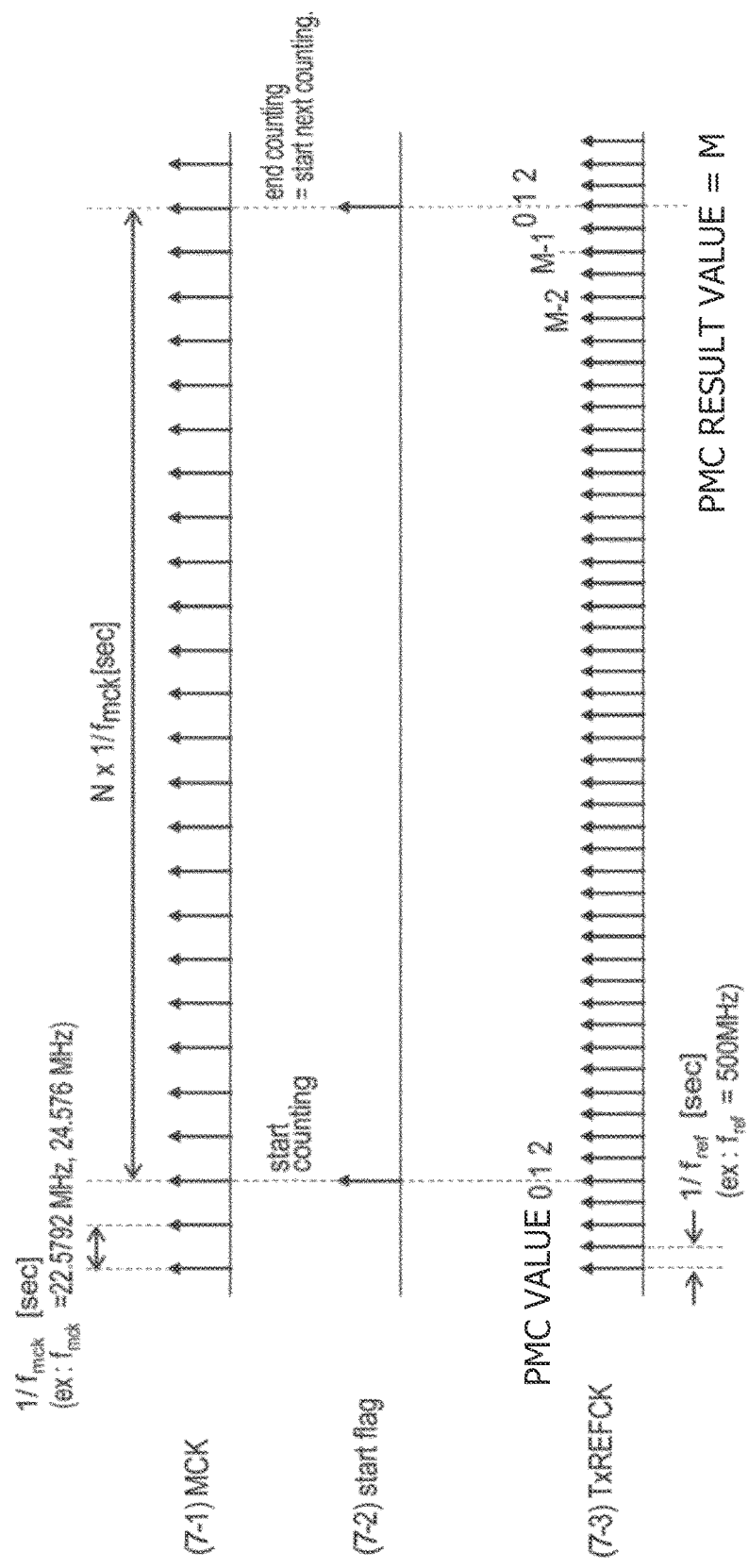
FIG. 7 is a timing chart of a TxREFCK generated on the basis of a symbol clock of the PHY clock generator, and an MCK.

FIG. 7 is a timing chart of a TxREFCK generated on the basis of a symbol clock of the PHY clock generator 130-1-3, and an MCK. FIG. 8 is a figure depicting an example of transmission parameters to be used to regenerate an MCK on a receiver side. FIG. 9 is a configuration diagram of an application packet generated at the SerDes 130.

The first I2 S device 120 is connected with the X'tal 140. The clock generator 120-3 generates a sampling clock 120-3-1, an MCK 120-3-3, and an SCK 120-3-2 in synchronization with a clock generated at the X'tal 140.

The ADC 120-1 converts, into a digital signal, a sound signal (audio signal) obtained by sound-collection at the microphone 110, by using the sampling clock 120-3-1. The I2 S encoder 120-2 converts the digital signal into the I2 S format depicted in FIG. 3, and inputs the signal in the I2 S format to the encapsulator 130-3 for I2 S transmission connected therewith.

The encapsulator 130-3 stores, on the FIFO 130-3-1, the WS signal and the SD from the I2 S encoder 120-2 in synchronization with the SCK. The I2 S signal in the FIFO 130-3-1 is read out according to a read clock with an appropriate speed, and an application packet is generated at the packet constructor 130-3-4 ((9-3) in FIG. 9).

As depicted in FIG. 7, the MCK divider 130-3-2 counts N which is an integer value set at the control registers 130-5 in the MCK input from the I2 S device 120, generates a start flag after every N, and outputs the start flag to the PMC 130-3-3 ((9-1), (9-2) in FIG. 9).

The PMC 130-3-3 counts the TxREFCK for the duration of the interval between start flags output from the MCK divider 130-3-2, and outputs the count value (PMC result value=M) to the packet constructor 130-3-4 (7-3 in FIG. 7). The MCK divider 130-3-2 and the PMC 130-3-3 are a counting section that counts the number of the reference signals TxREFCK included in one cycle of a divided signal of the MCK.

The control registers 130-5 output, to the packet constructor 130-3-4, the bit length of transmitted SD (I2 S audio data) (SD bit width), the number of transmitted audio channels, the frequency (fs frq) of the sampling clock, the multiplier K of the sampling clock (the frequency of the audio master clock MCK, fmck=K×fs frq), the MCK divisor N, and frequency information regarding TxRFECK (TxREFCK INFO).

The packet constructor 130-3-4 stores these pieces of information and the PMC result value M in the packet header ((9-2) in FIG. 9). The packet constructor 130-3-4 generates an application packet ((9-1) in FIG. 9) on the basis of the information from the control registers 130-5, the PMC result value, and the I2 S signal (SD) as mentioned above, and outputs the application packet to the frame constructor 130-2-1.

FIG. 8 depicts values of the audio master clock MCK frequency divisor N and the count value (PMC result value M) of the TxREFCK that is expected to be obtained corresponding to the audio master clock MCK frequency divisor N in a case where the TxREFCK frequency is 250 MHz, and the frequency of the audio master clock MCK is equal to the product of the frequency fs of a sampling clock which is 44.1 kHz or 48 kHz and 512 (K=512).

(Configuration of Application Packet for I2 S Transmission)

Figure 10B:
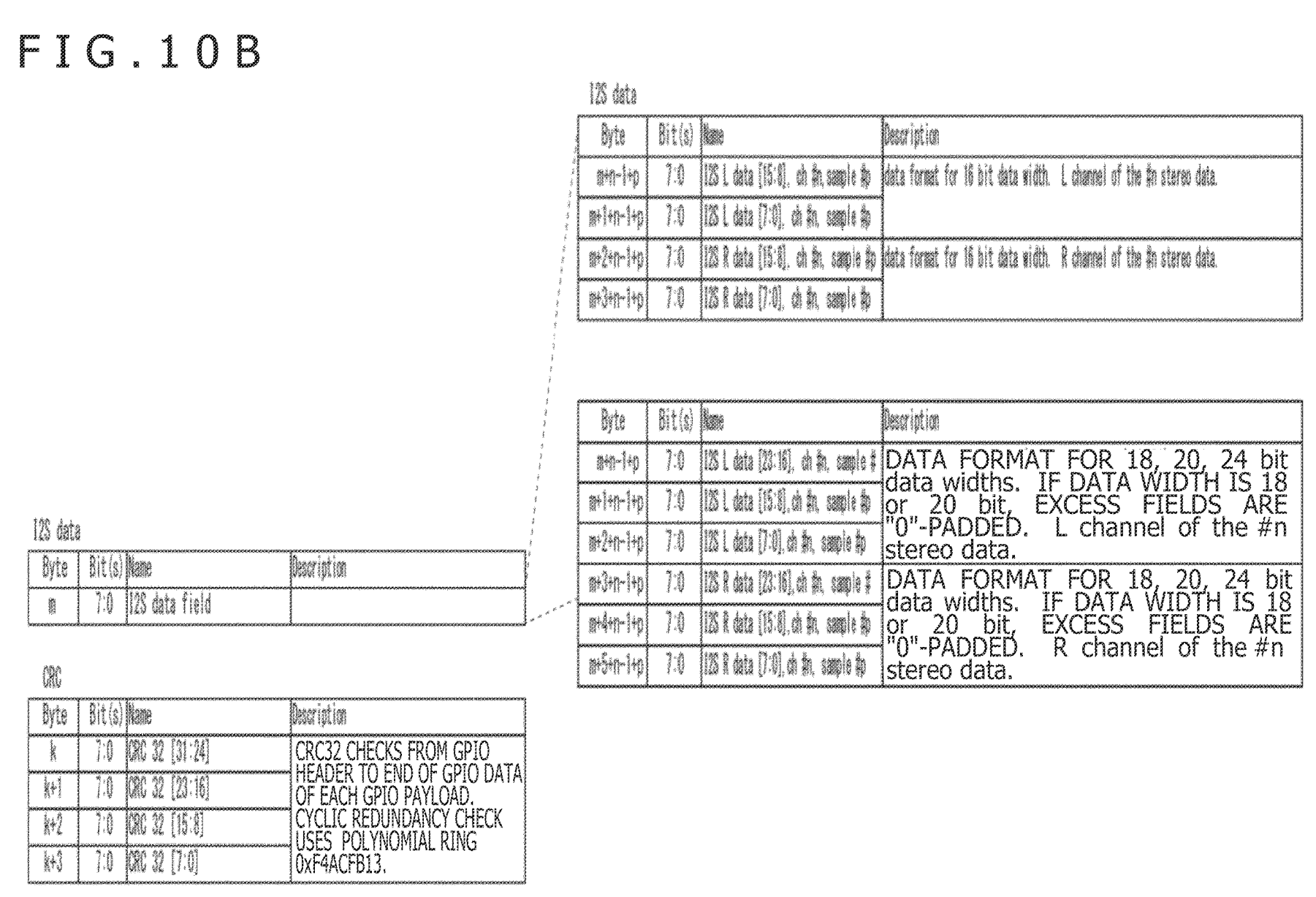

FIG. 10A and FIG. 10B are figures depicting the configuration of an application packet for I2 S signal transmission. FIG. 10A depicts the configuration of the header (I2 S header) of an application packet for I2 S signal transmission, and FIG. 10B depicts the configuration of data (I2 S data) and a CRC of the application packet for I2 S signal transmission.

The bits [7:5] of the first byte in the I2 S header depicted in FIG. 10A represent an I2 S frame format. The bits [7:5] which are 000 represent the I2 S format, the bits [7:5] which are 001 represent the left justified format, the bits [7:5] which are 010 represent the right justified format, and the bits [7:5] which are any of 011 to 111 represent reserved bits.

Figure 11A:
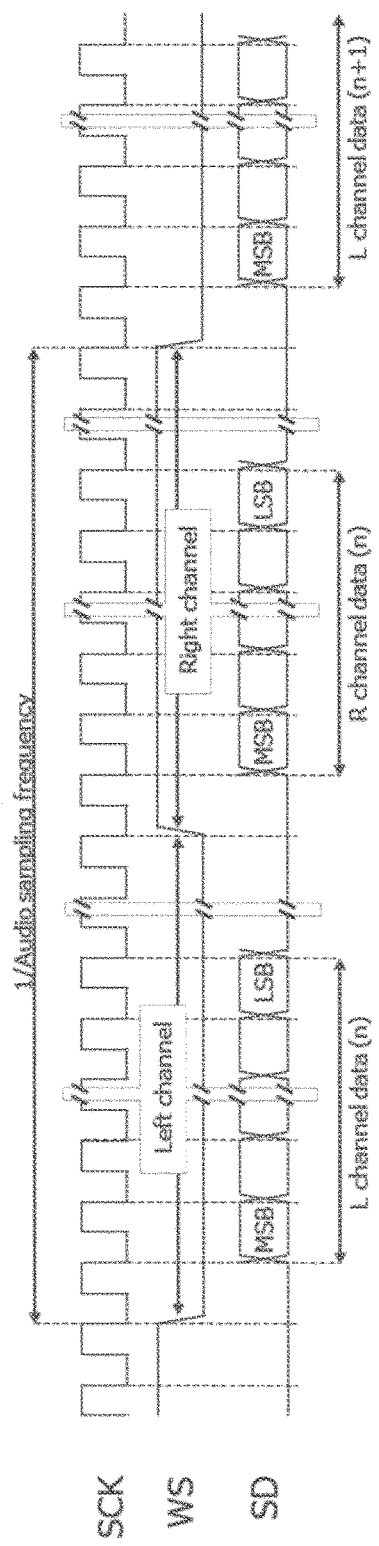
FIG. 11A is a timing chart of the original I2 S format.
Figure 11B:
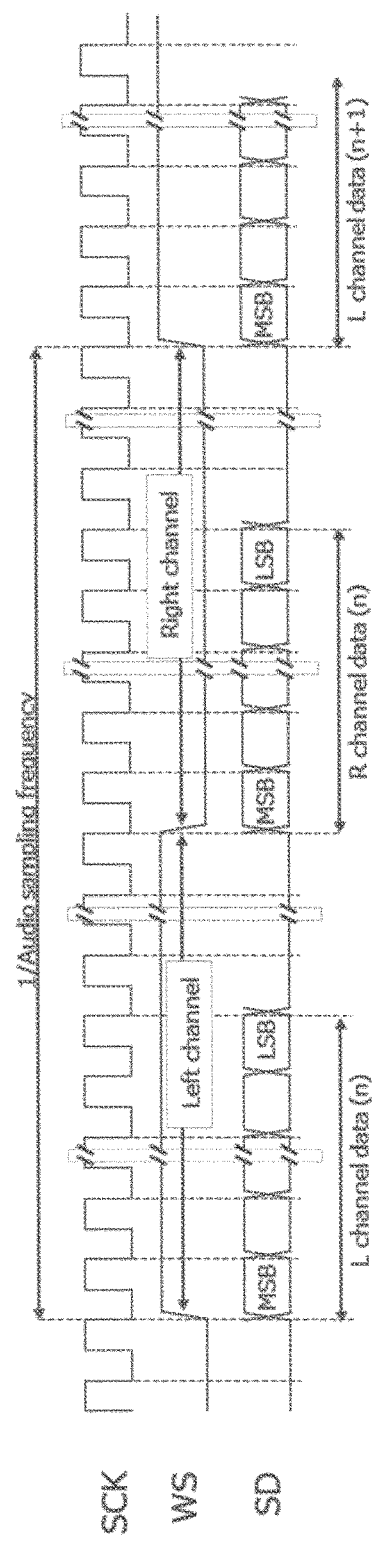
FIG. 11B is a timing chart of a left justified format.
Figure 11C:
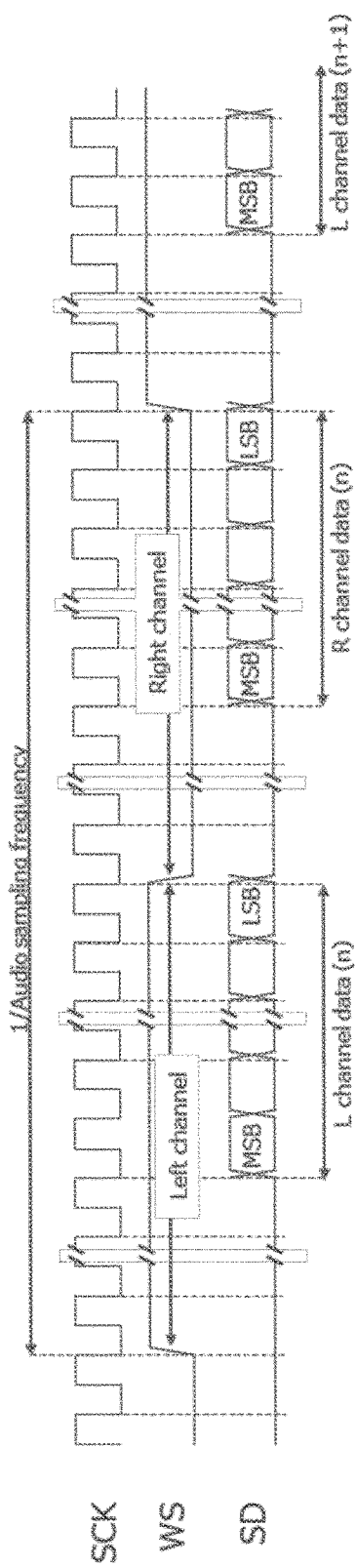
FIG. 11C is a timing chart of a right justified format.

FIG. 11A is a timing chart of the original I2 S format, FIG. 11B is a timing chart of the left justified format, and FIG. 11C is a timing chart of the right justified format.

As depicted in FIG. 11A, in the original I2 S format, SD is transmitted bit by bit in order from MSBs in low-level periods of a WS signal. As depicted in FIG. 11B, in the left justified format, an SD signal is transmitted bit by bit in order from MSBs in synchronization with timings at which a WS signal transitions from the low level to the high level. That is, the SD signal is transmitted in a left justified manner in synchronization with timings at which the WS signal rises. On the other hand, in the right justified format, as depicted in FIG. 11C, an SD signal is transmitted in a right justified manner such that LSBs of the SD signal are transmitted at timings at which a WS signal transitions from the high level to the low level. The bits [7:5] of the first byte in FIG. 10A specify whether an SD signal is in the left justified format or in the right justified format.

The bits [4:3] of the first byte in the I2 S header depicted in FIG. 10A represent an I2 S data bit width. The bits [4:3] which are 00 represent 16 bits, the bits [4:3] which are 01 represent 18 bits, the bits [4:3] which are 10 represent 20 bits, and the bits [4:3] which are 11 represent 24 bits.

The bits [2:0] of the first byte in the I2 S header depicted in FIG. 10A represent a 3 bit integer representing the number of pieces of stereo data. The bits [2:0] which are 1 mean that one piece of stereo (L×R) data is transmitted, and the bits [2:0] which are 4 mean that four pieces of stereo data are transmitted.

The bits [7:5] of the second byte in the I2 S header depicted in FIG. 10A represent the frequency Fs of a sampling clock. The bits [7:5] which are 000 represent 44.1 kHz, the bits [7:5] which are 001 represent 48 kHz, the bits [7:5] which are 010 represent 96 kHz, the bits [7:5] which are 011 represent 192 kHz, and the bits [7:5] which are any of 100 to 111 represent reserved bits.

The bits [4:0] of the second byte in the I2 S header depicted in FIG. 10A represent the multiplier K for generating an audio master clock MCK. The bits [4:0] which are 0x00 represent 32, the bits [4:0] which are 0x01 represent 64, the bits [4:0] which are 0x02 represent 128, the bits [4:0] which are 0x03 represent 256, the bits [4:0] which are 0x04 represent 512, the bits [4:0] which are 0x05 represent 1024, and the bits [4:0] which are any of 0x06 to 0x1F represent reserved bits.

The bits [7:5] of the third byte in the I2 S header depicted in FIG. 10A are reserved bits.

The bits [4:0] of the third byte in the I2 S header depicted in FIG. 10A represent the five most significant bits N [12:8] of the ratio of division N of the audio master clock MCK. The ratio of division N is a 13 bit integer. The bits [7:0] of the fourth byte in the I2 S header depicted in FIG. 10A represent N [7:0], and are the eight least significant bits of the audio master clock MCK.

The ratio of division N of the audio master clock MCK depends on the frequency Fm (=24.576 MHz, 22.5792 MHz, etc.) of the audio master clock MCK. If it is Fm=24.576 MHz, it is N=1536, and if it is Fm=22.5792 MHz, it is N=7056.

The bit 7 of the fifth byte in the I2 S header depicted in FIG. 10A is a reserved bit. The bits [6:4] of the fifth byte in the I2 S header depicted in FIG. 10A represent TxREFCK information. The bits [6:4] which are 000 represent 1 GHz, the bits [6:4] which are 001 represent 500 MHz, the bits [6:4] which are 010 represent 250 MHz, the bits [6:4] which are 100 represent 125 MHz, the bits [6:4] which are 101 represent 62.5 MHz, the bits [6:4] which are 110 represent 31.25 MHz, and the bits [6:4] which are 111 represent another frequency.

The bits [3:2] of the fifth byte in the I2 S header depicted in FIG. 10A are reserved bits. The bits [1:0] in the fifth byte in the I2 S header depicted in FIG. 10A represent a PMC result value [17:16]. The PMC result value is 18 bit integer data. The bits [7:0] of the sixth byte in the I2 S header depicted in FIG. 10A represent a PMC result value [15:8], and the bits [7:0] of the seventh byte in the I2 S header represent a PMC result value [7:0]. The PMC result value is a counted value of Pm/N (seconds) on the basis of the reference clock TxREFCK of 250 MHz. Ideally, when Fm=24.576 MHz and N=1536, it is the PMC result value=15625. When it is Fm=22.5792 MHz and it is N=7056, it is the PMC result value=78125. A receiving apparatus can regenerate Fm by using the PMC result value and N.

The I2 S data depicted in FIG. 10B starts from the m-th byte. The bits [7:0] of each byte represent an I2 S data field. More specifically, the bits [7:0] of the (m+n−1+p)-th byte in the I2 S data represent I2 S data [15:8] of the L channel of a sample p in the n-th stereo data, and the bits [7:0] of the (m+1+n−1+p)-th byte in the I2 S data represent I2 S data [7:0] of the L channel of the sample p in the n-th stereo data. These two bytes represent a data format for a 16 bit data width of the L channel in the n-th stereo data.

The bits [7:0] of the (m+2+n−1+p)-th byte in the I2 S data depicted in FIG. 10B represent I2 S data [15:8] of the R channel of the sample p in the n-th stereo data, and the bits [7:0] of the (m+3+n−l+p)-th byte in the I2 S data represent I2 S data [7:0] of the R channel of the sample p in the n-th stereo data. These two bytes represent a data format for a 16 bit data width of the R channel in the n-th stereo data.

The bits [7:0] of the (m+n−l+p)-th byte in the I2 S data depicted in FIG. 10B represent I2 S data [23:16] of the L channel of the sample p in the n-th stereo data, the bits [7:0] of the (m+1+n−l+p)-th byte in the I2 S data represent I2 S data [15:8] of the L channel of the sample p in the n-th stereo data, and the bits [7:0] of the (m+2+n−l+p)-th byte in the I2 S data represent I2 S data [7:0] of the L channel of the sample p in the n-th stereo data. These three bytes represent a data format for 18, 20, and 24 bit data widths of the L channel in the n-th stereo data, and excess bit fields of data with a 18 bit or 20 bit data width are 0-padded.

The bits [7:0] of the (m+3+n−1+p)-th byte in the I2 S data depicted in FIG. 10B represent I2 S data [23:16] of the R channel of the sample p in the n-th stereo data, the bits [7:0] of the (m+4+n−1+p)-th byte in the I2 S data represent I2 S data [15:8] of the R channel of the sample p in the n-th stereo data, and the bits [7:0] of the (m+5+n−1+p)-th byte in the I2 S data represent I2 S data [7:0] of the R channel of the sample p in the n-th stereo data. These three bytes represent a data format for 18, 20, and 24 bit data widths of the R channel in the n-th stereo data, and excess bit fields of data with a 18 bit or 20 bit data width are 0-padded.

The bits [7:0] of the k-th byte in the CRC depicted in FIG. 10B represent CRC32 [31:24], the bits [7:0] of the (k+1)-th byte in the CRC represent CRC32 [23:16], the bits [7:0] of the (k+2)-th byte in the CRC represent CRC32 [15:8], and the bits [7:0] of the (k+3)-th byte in the CRC represent CRC32 [7:0]. The CRC32 checks from the GPIO header of each GPIO payload to the end of GPIO data. A cyclic redundancy check (CRC) uses a polynomial ring 0xF4ACFB13.

(Details of Receiver Side)

Next, the internal configuration of and operation by the SerDes 230 are explained. FIG. 12 is a block diagram depicting the internal configuration of the deencapsulator 230-4 in the SerDes 230. The deencapsulator 230-4 has a packet deconstructor 230-4-1, an FIFO 230-4-2, an I2 S encoder (I2 S ENC) 230-4-3, an REFCK ratio calculating section (REFCK ratio Calc) 230-4-4, a TxREFCK regenerator 230-4-5, a TxREFCK divider 230-4-6, an MCK regenerator 230-4-7, and an SCK regenerator 230-4-8.

The SerDes 230 regenerates the frequency fmck of an MCK generated by the transmitter-side I2 S device 120, and transmits the frequency fmck along with a regenerated I2 S signal (an SCK, a WS signal, and SD) to the I2 S device 220.

The CDR 230-1-3 in the PHY block 230-1 in the receiver-side SerDes 230 extracts change points of the signal level of the received transmission symbols as explained already, and regenerates a symbol clock ((5-9) in FIG. 5) synchronous with a transmission symbol rate transmitted from the SerDes 130. The clock divider (230-1-4) divides the symbol clock ((5-9) in FIG. 5) supplied from the CDR 230-1-3, and generates a clock necessary for a process by each section. Each of these clock frequencies depends on an individual manner of implementation similarly to the transmitter-side SerDes 130, and 1 GHz, 500 MHz, 250 MHz, 125 MHz, 62.5 MHz, or the like that is in a frequency division relation with its symbol rate can be generated easily while the synchronous relation with the transmitter-side symbol clock is maintained.

As a reference clock (RxREFCK) for regenerating a regeneration-side I2 S audio master clock MCK, any one of 1 GHz, 500 MHz, 250 MHz, 125 MHz, 62.5 MHz, and the like mentioned above is used. Since which frequency is to be used depends on a manner of implementation, the control registers 230-5 supply information regarding the reference clock (RxREFCK_INFO) to the deencapsulator 230-4 for I2 S signal transmission. Simultaneously, the clock divider 230-1-4 supplies, to the deencapsulator 230-4, the reference clock (RxREFCK) with the frequency specified at the control registers 230-5.

Next, operation by the deencapsulator 230-4 is explained. The frame deconstructor 230-2-2 extracts an application packet ((9-1) in FIG. 9) for transmission of the I2 S signal, and supplies the application packet to the packet deconstructor 230-4-1.

The packet deconstructor 230-4-1 analyzes the packet header ((9-2) in FIG. 9) of the application packet ((9-1) in FIG. 9), and acquires information for regenerating a signal conforming to the I2 S protocol, the bit width of transmitted SD (I2 S audio data), the number of transmitted audio channels, the frequency (fs frq) of a sampling clock, the multiplier K of the sampling clock (the frequency of an audio master clock MCK, fmck=K×fs frq), an MCK divisor N, reference clock frequency information (TxREFCK INFO), and a TxREFCK count value (PMC result value).

The RFECK ratio calculating section 230-4-4 calculates a frequency ratio R (=TxREFCK frequency/RxREFCK frequency) on the basis of the frequency information TxREFCK INFO) regarding the transmitter-side REFCK and the frequency information (RxREFCK INFO) regarding the receiver-side REFCK obtained from the control registers 230-5.

By using the obtained frequency ratio R, the TxREFCK regenerator 230-4-5 multiplies the frequency of the RxREFCK by R if it is R≥1, and divides the RxREFCK by R if it is R<1, to thereby regenerate the TxREFCK synchronous with the RxREFCK. The regenerated TxREFCK has a frequency identical to the frequency of the transmitter-side TxREFCK.

The TxRFECK Divider 230-4-6 divides the TxREFCK supplied from the TxREFCK regenerator 230-4-5 by the PMC result value M acquired at the packet deconstructor 230-4-1, and outputs the divided TxREFCK/M to the MCK regenerator 230-4-7.

By multiplying the TxREFCK/M by the transmitter-side MCK divisor N by using N acquired by the packet deconstructor 230-4-1, the MCK regenerator 230-4-7 regenerates an audio master clock MCK synchronous with the transmitter-side audio master clock MCK. The operation mentioned above is the most important MCK regeneration procedure.

The SCK regenerator 230-4-8 regenerates the SCK by multiplying the cycle of the MCK by the reciprocal of K which is the ratio of the frequency fs frq of the sampling clock and the double of the SD bit width (SDBW).

On the other hand, the packet deconstructor 230-4-1 takes out the packetized SD (audio serial data) ((9-3) in FIG. 9) from the application packet ((9-1) in FIG. 9) and writes the packetized SD in the FIFO 230-4-2 according to a write clock with an appropriate frequency.

The SD written in the FIFO 230-4-2 is read out according to the SCK, and supplied to the I2 S encoder 230-4-3.

The I2 S encoder 230-4-3 regenerates the I2 S signal in FIG. 3 by using, along with the SD, the information necessary for conversion into the I2 S signal supplied from the packet deconstructor 230-4-1, the SD bit width, the number of transmitted audio channels, and the frequency (fs frq) of the sampling clock. The I2 S signal including the SCK, the WS signal, and the SD is output to the I2 S device 220 connected to the SerDes 230, and the MCK regenerated at the MCK regenerator 230-4-7 also is output to the I2 S device 220.

The I2 S device 220 converts the I2 S signal into an analog audio signal in synchronization with the MCK, and the audio signal is finally output as a sound at the speaker 210.

By the procedure mentioned above, the frequency information regarding the transmitter-side MCK is transmitted to the receiver side, and the MCK can be regenerated accurately on the receiver side by using a PHY clock synchronous between transmission and reception.

In this manner, in the first embodiment, the SerDes 130 receives the WS signal, the SD, and the SCK conforming to the I2 S standard, and the MCK with a frequency which is equal to the product of the frequency of the SCK and the multiplier, the number of the reference clock TxREFCK included in a predetermined cycle of a divided signal of the MCK is counted, and a packet including the counted number, frequency information regarding the reference clock TxREFCK, the ratio of division N of the divided signal to the MCK, and the frequency ratio K of the frequency of the MCK to the frequency fs of the sampling clock is generated, and is transmitted to the SerDes 230. The SerDes 230 receives the packet mentioned above, and can recover the MCK on the basis of the information described above included in the packet. Therefore, even in a case where the SerDes 130 and the SerDes 230 transmit and receive packets at timings which are asynchronous to an I2 S signal, the SerDes 230 can recover the I2 S signal from the received packets, and regenerate the I2 S signal correctly.

Second Embodiment

Whereas the I2 S device 120 operates asynchronously to the SerDes 130 in the first embodiment, the I2 S device 120 and the SerDes 130 may operate according to mutually synchronous clocks.

FIG. 13 is a block diagram depicting the internal configuration of the I2 S device 120, and the encapsulator 130-3 and the PHY clock generator 130-1-3 in the SerDes 130 according to the second embodiment. The I2 S device 120 in FIG. 13 is connected with a clock generator 130-6 instead of the X'tal 140 in FIG. 6. The reference clock TxREFCK generated at the PHY block 130-1 is input to the clock generator 130-6. The clock generator 130-6 generates a reference clock of, for example, 250 MHz in synchronization with the reference clock TxREFCK. The clock generator 120-3 in the I2 S device 120 generates, for example, a sampling clock of 50 kHz, and an MCK of 25.6 MHz in synchronization with the reference clock of 250 MHz generated at the clock generator 130-6.

The SerDes 130 according to the second embodiment operates similarly to the SerDes 130 according to the first embodiment, but parameters set by the control registers 130-5 are mutually different. FIG. 14 is a figure depicting values of parameters to be used when the SerDes 230 according to the second embodiment regenerates an MCK. In the second embodiment, the TxREFCK and the MCK are in an integer-multiple relation. Accordingly, it is N=64 and the PMC result value M=625.

In this manner, since the I2 S device 120 is caused to operate in synchronization with the reference clock TxREFCK generated at the PHY block 130-1 in the SerDes 130 in the second embodiment, the frequencies of the audio master clock MCK and the TxREFCK can be given an integer-multiple relation. In addition, since the I2 S device 120 generates an I2 S signal in synchronization with a PHY clock that is used in common by the physical layers of the transmitter-side SerDes 130 and the receiver-side SerDes 230 in the second embodiment, it becomes unnecessary to use the X'tal 140 in FIG. 6. In addition, since the I2 S device 120 according to the second embodiment generates the I2 S signal with a frequency higher than that in the first embodiment, jitter characteristics on the regeneration side can be enhanced.

Third Embodiment

The SerDes 130 and the SerDes 230 can manage information regarding mutually synchronous timestamps.

For example, in a case where the SerDes 130 and the SerDes 230 perform high-speed serial communication conforming to the ASA standard, the PTB (Precision Time Base) is defined in the ASA standard. The PTB enables synchronization of time information with 4-nsec resolution by an exchange of packets to serve as the time base between the SerDes 130 and the SerDes 230. The time information in the PTB is synchronized with a clock of 250 MHz (hereinafter, a PTB clock), and this clock is used as a TxREFCK. In this case, since the frequency of the TxREFCK is fixed at 250 MHz, frequency information regarding the TxREFCK does not need to be transmitted to the receiver side. Other information (N, K, etc.) needs to be transmitted to the SerDes 230 by being included in the header of an application packet as in the first embodiment. Similarly, the frequency information regarding an RxREFCK is not necessary also at the SerDes 230.

FIG. 15 is a block diagram depicting the internal configuration of the encapsulator 130-3 in the SerDes 130 according to a third embodiment. As in FIG. 6, the encapsulator 130-3 in FIG. 15 has the FIFO 130-3-1, the MCK divider 130-3-2, the PMC 130-3-3, and the packet constructor 130-3-4. Instead of the reference clock TxREFCK generated at the PHY clock generator 130-1-3 in FIG. 6, a PTB clock generated at a PTB clock generator 130-7 is input to the encapsulator 130-3 in FIG. 15.

Figure 16:
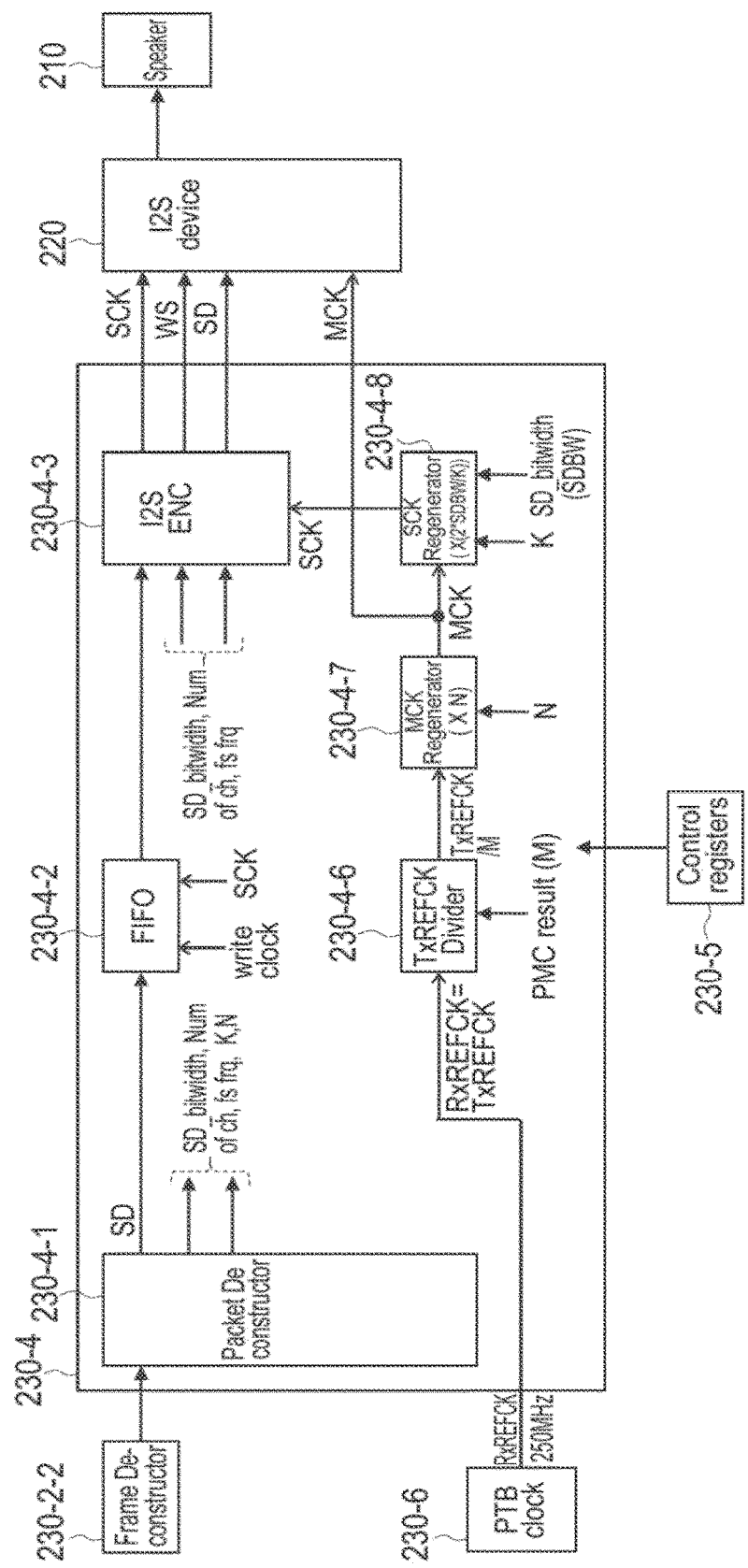
FIG. 16 is a block diagram depicting the internal configuration of the deencapsulator in the SerDes according to the third embodiment.

FIG. 16 is a block diagram depicting the internal configuration of the deencapsulator 230-4 in the SerDes 230 according to the third embodiment. As in FIG. 12, the deencapsulator 230-4 in FIG. 16 has the packet deconstructor 230-4-1, the FIFO 230-4-2, the I2 S encoder (I2 S ENC) 230-4-3, the TxREFCK divider 230-4-6, the MCK regenerator 230-4-7, and the SCK regenerator 230-4-8. Instead of the reference clock RxREFCK generated at the PHY block 230-1 in FIG. 12, a PTB clock generated at a PTB clock generator 230-6 is input to the deencapsulator 230-4 in FIG. 16.

The PTB clock generator 130-7 and the PTB clock generator 230-6 generate PTB clocks that synchronize the Precision Time Base (PTB) standardized by the ASA standard. The PTB enables synchronization of time information with 4-nsec resolution by an exchange of packets to serve as the time base between the SerDes 130 and the SerDes 230. The PTB clocks of 250 MHz used to generate the PTB information are used as the TxREFCK and the RxREFCK. In this case, since the frequency of the TxREFCK and the RxREFCK is determined as 250 MHz, and the transmitter side and the receiver side generate the PTB clocks with the same frequency, the TxREFCK INFO does not need to be transmitted to the receiver side. In other respects, information and operation are the same as those of the SerDes 130 and the SerDes 230 according to the first embodiment.

In this manner, since the PTB clocks used to generate the PTB information to be used by the SerDes 130 and the SerDes 230 to manage timestamp information are used as the reference clocks TxREFCK and RxREFCK, it becomes unnecessary to transmit information regarding the TxREFCK from the SerDes 130 to the SerDes 230, and regenerate the TxREFCK in the SerDes 230, information to be transmitted and received between the SerDes 130 and the SerDes 230 can be reduced, and the internal configuration of the SerDes 130 and the SerDes 230 can be simplified.

Fourth Embodiment

In a fourth embodiment, not only the SerDes 130 and the SerDes 230, but the I2 S device 120 also uses a PTB clock.

FIG. 17 is a block diagram depicting the internal configuration of the I2 S device 120 and the encapsulator 130-3 in the SerDes 130 according to the fourth embodiment.

Instead of a clock generated at the X'tal 140, a PTB clock of 250 MHz generated at the PTB clock generator 130-7 is input to the I2 S device 120.

Thereby, an I2 S signal (an SCK, SD, a WS signal, and an MCK) generated at the I2 S device 120 can be synchronized with the PTB clock. In addition, the X'tal 140 can be omitted.

Fifth Embodiment

A fifth embodiment is characterized in that instead of transmission of frequency information regarding an MCK from the SerDes 130 to the SerDes 230, a WS signal representing the frequency of a sampling clock is transmitted.

Figure 19:
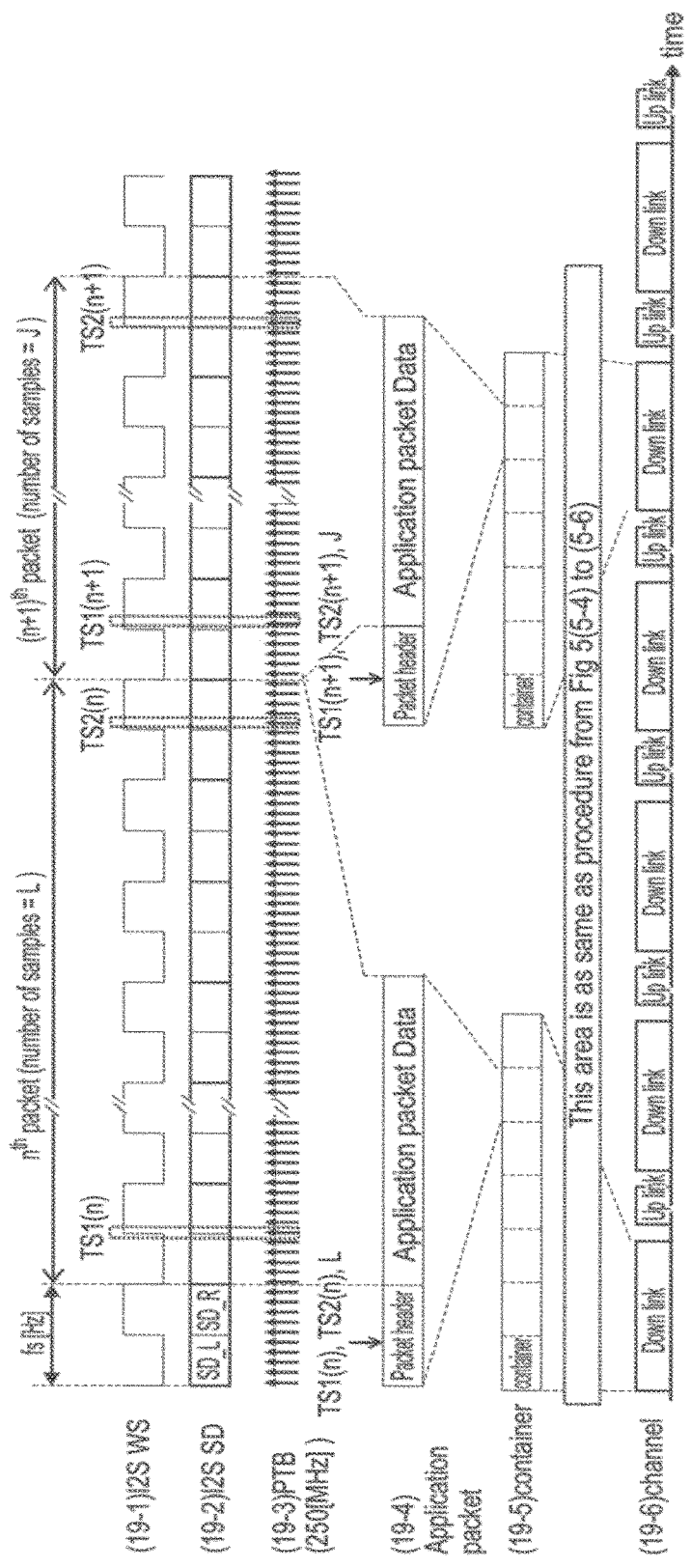
FIG. 19 is a timing chart of packets transmitted between the two SerDeses.

FIG. 18 is a block diagram depicting the internal configuration of the I2 S device 120 and the encapsulator 130-3 in the SerDes 130 according to the fifth embodiment. FIG. 19 is a timing chart of packets transmitted between the SerDes 130 and the SerDes 230.

Figure 20:
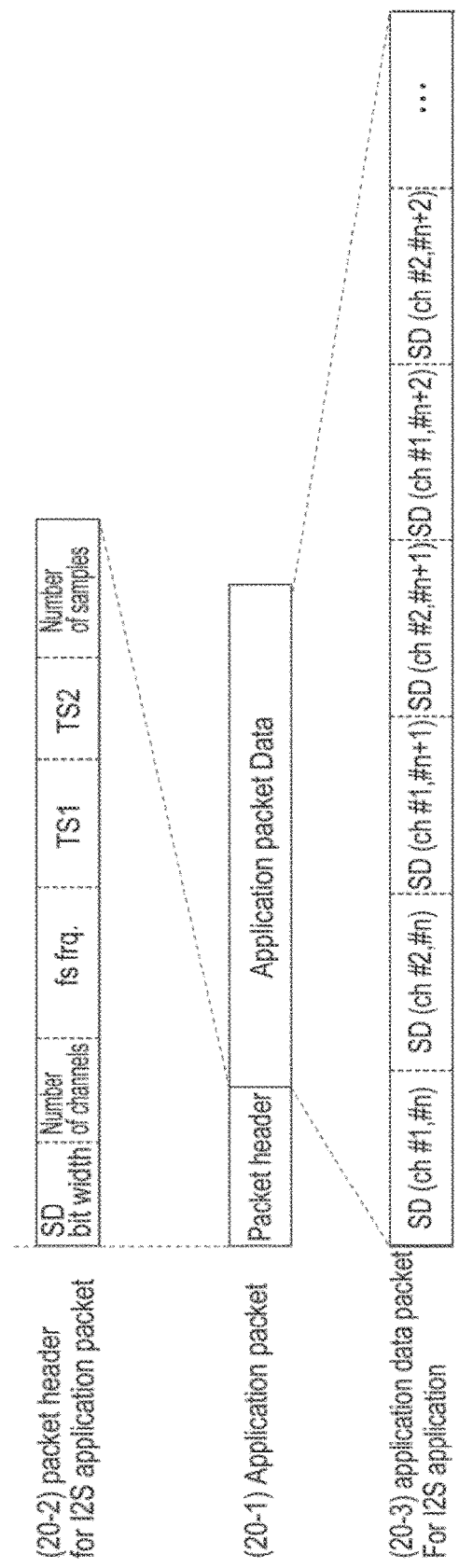
FIG. 20 is a figure depicting the configuration of an application packet generated at the SerDes.

FIG. 20 is a figure depicting the configuration of an application packet generated at the SerDes 130.

The internal configuration of the I2 S device 120 in FIG. 18 is the same as those in FIG. 6 and FIG. 15. The encapsulator 130-3 in the SerDes 130 in FIG. 18 has the FIFO 130-3-1, the packet constructor 130-3-4 and a PTB time stamper 130-3-5. The PTB time stamper 130-3-5 is provided instead of the MCK divider 130-3-2 and the PMC 130-3-3 in FIG. 15. The PTB time stamper 130-3-5 operates in synchronization with a PTB clock.

The PTB time stamper 130-3-5 is supplied with a WS signal representing the frequency of a sampling clock from the I2 S device 120, and a PTB time with 4-nsec resolution (250 MHz) supplied from a PTB timer 130-8. This PTB time is synchronous with a receiver-side PTB time due to a PTB synchronization process standardized by the ASA standard.

The PTB time stamper 130-3-5 performs sampling of the rising edge of an input WS, that is, almost the center of one sample interval of I2 S data, on the basis of the PTB time with 4-nsec resolution (250 MHz) supplied from the PTB timer 130-8, and supplies the PTB time to the packet constructor 130-3-4.

The packet constructor 130-3-4 obtains SD and WS which are I2 S audio data which is rate-adjusted via the FIFO 130-3-1. The packet constructor 130-3-4 includes the obtained SD in an application packet at a timing specified by the frame constructor (130-2-1) ((19-2), 19-4 in FIG. 19). Note that the arrangement of the SD may be the same as (9-3) in FIG. 9. Because of this, the number of samples of SD included in each application packet is not constant but increases or decreases. In the example depicted in FIG. 19, the n-th packet includes SD including L samples, and the (n+1)-th packet includes SD including J samples ((19-2) in FIG. 19).

The packet constructor 130-3-4 includes the number of samples of SD in the header of each application packet (19-4 in FIG. 19).

Furthermore, the packet constructor 130-3-4 includes, in the packet header, a TS1 and a TS2 which are PTB times of the first SD and the last SD included in an application packet in PTB times of the rising edges of WS of SD output from the PTB time stamper 130-3-5 (19-4 in FIG. 19).

The packet constructor 130-3-4 further obtains the bit length of transmitted SD (I2 S audio data) (SD bit width), the number of transmitted audio channels and the frequency (fs frq) of a sampling clock as reference information from the control registers 130-5, and includes these pieces of information, the TS1, the TS2, and the number of samples in the packet header together.

In this manner, the packet header generated by the packet constructor 130-3-4 has the SD bit width, the number of channels, the frequency fs frq of the sampling clock, the TS1, the TS2, and the number of samples as depicted in FIG. 20.

The SD bit width is a bit width of SD (I2 S audio serial data) of each channel. The number of channels is the number of audio channels. For example, in a case where it is the number of channels=2, this means normal stereo. fs frq is the frequency of an audio sampling clock and is 44.1 kHz or 48 kHz, for example. The TS1 is a timing of the rising edge of the WS in the first SD in a plurality of pieces of SD in the packet. The TS2 is a timing of the rising edge of the WS in the last SD in the plurality of pieces of SD in the packet. The number of samples is the number of samples of the SD included in one packet.

In addition, an application packet that follows the packet header includes a plurality of pieces of SD corresponding to all samples. Each piece of SD is serial data specified by a sample number and a channel number. The packet constructor 130-3-4 outputs, to the frame constructor 130-2-1, an application packet (19-4 in FIG. 19) created by putting the packet header and the application packet including the plurality of pieces of SD together.

The frame constructor 130-2-1 adds sync for synchronization to a plurality of application packets, and configures a transmission frame, and finally the transmission frame is output to a channel. Since these processes are the same as those in FIG. 5 ((5-4)) to ((5-7)), explanations thereof are omitted.

Next, a receiver-side process is explained. Process operation by the frame deconstructor in the SerDes 230 is similar to those in the first to fourth embodiment.

FIG. 21 is a block diagram depicting the internal configuration of the deencapsulator 230-4 in the SerDes 230 according to the fifth embodiment. The deencapsulator 230-4 in FIG. 21 has the packet deconstructor 230-4-1, the FIFO 230-4-2, the I2 S encoder 230-4-3, the MCK regenerator 230-4-7, the SCK regenerator 230-4-8, the WS frequency calculating section, and the PTB clock divider.

Process operation by the packet deconstructor 230-4-1 is similar to those in the first to fourth embodiments. The packet deconstructor 230-4-1 acquires the PTB timestamps TS1 and TS2 representing the positions of the rising edges of WS of the first data and the last data of SD of all L samples, and the number of the samples that are included in the packet header of a received application packet, and supplies them to a WS frequency calculating section 230-4-9. The WS frequency calculating section 230-4-9 calculates (TS2−TS1)/(number of samples). A result of this calculation represents the average cycle of the frequencies of audio sampling clocks.

In addition, it is also possible to obtain the cycle of the frequencies of sampling clocks with higher precision by adding together and determining the average of calculation results of (TS2-TS1)/(number of samples) obtained from each of a plurality of packets. The WS frequency calculating section 230-4-9 outputs the obtained cycle to a PTB clock divider 230-4-10.

The PTB clock divider 230-4-10 generates a WS signal by dividing a clock of 250 MHz supplied from the PTB clock 230-6 by the value obtained by the WS frequency calculating section 230-4-9. The frequency of the WS signal is the same as the frequency of the sampling clock.

The MCK regenerator 230-4-7 regenerates an audio master clock MCK necessary for processes at the I2 S device 220 by multiplying the WS signal generated at the PTB clock divider 230-4-10 by the constant K by using K obtained by the control registers 230-5.

Furthermore, the SCK regenerator 230-4-8 regenerates an SCK by setting the cycle of the SCK to a cycle obtained by multiplying the cycle of the WS signal by an SD bit width and 2. In synchronization with this SCK, the SD is read out from the FIFO 230-4-2, and the SD having been read out is encoded at the I2 S encoder 230-4-3. Since processes performed at the I2 S encoder 230-4-3 and thereafter are similar to those performed in the SerDes 230 according to the first to fourth embodiments, explanations thereof are omitted.

Figure 22B:
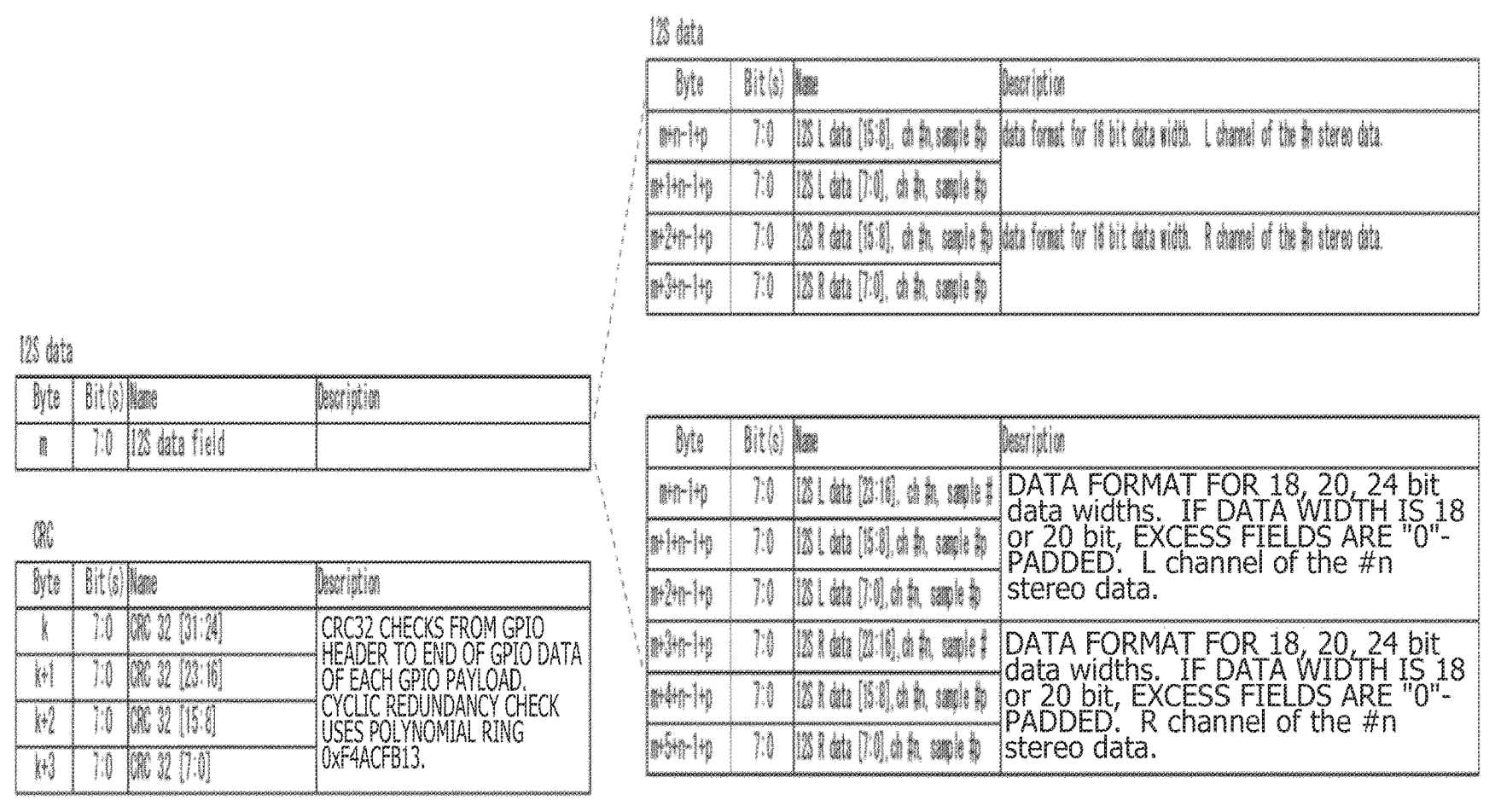

FIG. 22A and FIG. 22B are figures more specifically depicting the configuration of an application packet for I2 S signal transmission generated by the SerDes 130 according to the fifth embodiment. FIG. 22A depicts the configuration of the header (I2 S header) of the application packet for I2 S signal transmission, and FIG. 22B depicts the configuration of data (I2 S data) and a CRC of the application packet for I2 S signal transmission.

Since FIG. 22B is the same as FIG. 10B, an explanation thereof is omitted. The second half of the I2 S header in FIG. 22A is different from the I2 S header in FIG. 10A. Hereinbelow, differences from the I2 S header in FIG. 10A are mainly explained.

The bits [7:5] of the first byte and the second byte in the I2 S header depicted in FIG. 22A are the same as those in FIG. 10A. The bits [4:0] of the second byte in the I2 S header depicted in FIG. 22A are reserved bits.

The bits [7:0] of the third byte in the I2 S header depicted in FIG. 22A represent TS1 [23:16], the bits [7:0] of the fourth byte in the I2 S header represent TS1 [15:8], and the bits [7:0] of the fifth byte in the I2 S header represent TS1 [7:0]. In these third to fifth bytes, the TS1 represents a 24 bit integer, and a PTB time of the rising edge of the WS signal at the first SD in a plurality of pieces of SD in the packet.

The bits [7:0] of the sixth byte in the I2 S header depicted in FIG. 22A represent TS2 [23:16], the bits [7:0] of the seventh byte in the I2 S header represent TS2 [15:8], and the bits [7:0] of the eighth byte in the I2 S header represent TS2 [7:0]. In these sixth to eighth bytes, the TS2 represents a 24 bit integer, and a PTB time of the rising edge of the WS signal at the last SD in a plurality of pieces of SD in the packet.

The bits [7:0] of the ninth byte in the I2 S header depicted in FIG. 22A represent the number of samples [15:8], and the bits [7:0] of the tenth byte in the I2 S header represent the number of samples [7:0]. These ninth to tenth bytes represent a 16 bit integer, and represent the number of I2 S data samples transmitted in this packet.

Note that setting information that is included as values included in the packet headers depicted in FIG. 9, FIG. 10A, FIG. 20, and FIG. 22A explained thus far, and does not need to be transmitted at each instance of packet transmission once the information is set such as the bit width of transmitted SD (I2 S audio data), the number of transmitted audio channels, the frequency (fs frq) of a sampling clock, the multiplier K of the sampling clock (the frequency of an MCK, fmck=K×fs frq), the MCK divisor N or the reference clock frequency information (TxREFCK INFO) may be not included in a packet header, but may be transmitted from a transmitter side to a receiver side by using an OAM channel or other information transmission means.

Figure 23:
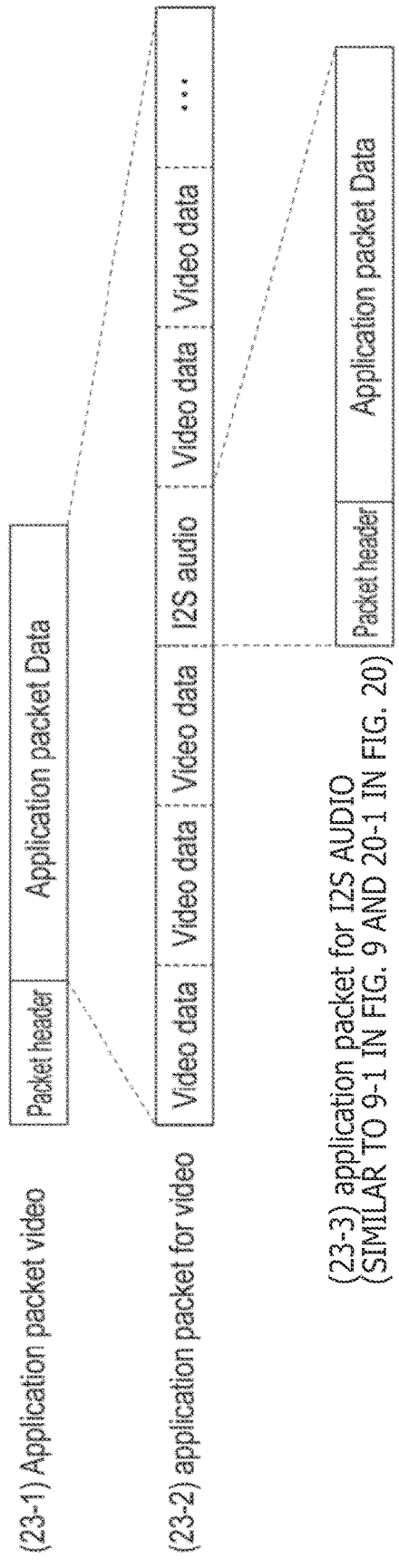
FIG. 23 is a figure depicting an example in which an I2 S signal is transmitted by being included in an application packet for transmission of video data.

Furthermore, the application packets ((9-1) in FIG. 9 and (20-1) in FIG. 20) for transmission of transmit I2 S signals depicted in FIG. 9 and FIG. 20 explained thus far may not be transmitted for one independent application but may be transmitted by being arranged in an application packet for transmission of video data as depicted in FIG. 23, for example. In the example depicted in FIG. 23, a plurality of pieces of video data is included in the application packet, and I2 S audio data is included between those pieces of video data.

In this manner, since the timing TS1 of the rising edge of the WS signal in the first SD in a plurality of pieces of SD in an application packet, the timing TS2 of the rising edge of the WS signal in the last SD in the plurality of pieces of SD, and the number of samples of the SD are included in a packet header in the fifth embodiment, the average cycle of the frequencies of sampling clocks can be calculated, and a WS signal can be generated on the basis of a result of the calculation. Therefore, the fifth embodiment eliminates the necessity for transmitting an MCK from the transmitter-side SerDes 130 to the receiver-side SerDes 230 and for counting the number of the reference clock TxREFCK included in a divided signal of the MCK in the SerDes 230 unlike the first to fourth embodiments, and accordingly can simplify the configuration in the SerDes 230.

Note that the present technology may be implemented in the following configurations.

(1)
A communication apparatus including:
a counting section that counts the number of a predetermined reference clock included in one cycle of a divided signal of an audio master clock with a frequency that is equal to a product of a frequency of a sampling clock for sampling of an audio signal and a multiplier on the basis of the audio master clock, a ratio of division of the divided signal, and the predetermined reference clock; and
a packet generator that generates a packet including information including the number counted at the counting section, a bit width of SD (Serial Data) conforming to an I2 S standard, the frequency of the sampling clock, the ratio of division of the divided signal to the audio master clock, a frequency ratio of the frequency of the audio master clock to the frequency of the sampling clock, and the SD.

(2)
The communication apparatus according to (1), in which the packet generated by the packet generator includes a header portion and a data portion,
the header portion includes the number counted at the counting section, the bit width of the SD, the frequency of the sampling clock, the ratio of division, and the frequency ratio, and
the data portion includes a plurality of pieces of the SD.

(3)
The communication apparatus according to (2), in which the header portion includes the bit width of the SD, the number of channels of the SD, the frequency of the sampling clock, the ratio of division of the divided signal to the audio master clock, the frequency ratio of the frequency of the audio master clock to the frequency of the sampling clock, a frequency of the reference clock, and the number counted at the counting section.

(4)
  The communication apparatus according to (3), in which the data portion includes the SD of all channels and all samples.
(5)
  The communication apparatus according to any one of (1) to (4), including:
    a physical layer clock generator that generates a clock to be used in common by physical layers of both the communication apparatus and a communication partner apparatus; and
    a divider that divides the clock generated at the physical layer clock generator and generates the reference clock.
(6)
  The communication apparatus according to (5), in which a frequency of the clock generated at the physical layer clock generator is 250 MHz.
(7)
  The communication apparatus according to (6), in which the frequency of the audio master clock is 25.6 MHz, and the frequency of the sampling clock is 50 kHz.
(8)
  The communication apparatus according to any one of (1) to (7), in which
    the sampling clock and the audio master clock are asynchronous with the reference clock.
(9)
  The communication apparatus according to any one of (1) to (7), in which
    the sampling clock and the audio master clock are synchronous with the reference clock.
(10)
  The communication apparatus according any one of (1) to (4), including:
    a PTB clock generator that generates a PTB (Precision Time Base) clock to be used to generate timestamp information to be used in common by the communication apparatus and a communication partner apparatus, in which
    the reference clock is the PTB clock.
(11)
  The communication apparatus according to (10), in which the audio master clock is synchronous with the PTB clock.
(12)
  The communication apparatus according to (10) or (11), in which
    a frequency of the PTB clock is 250 MHz.
(13)
  A communication apparatus including:
    a counting section that receives a WS (Word Select) signal conforming to an I2 S standard, and counts, on the basis of a predetermined reference clock used in common by the communication apparatus and a communication partner apparatus, first timing information representing a timing of a logical change of the WS signal in a first piece in a plurality of pieces of SD (Serial Data) included in one packet to be transmitted to the communication partner apparatus, and second timing information representing a timing of a logical change of the WS signal in a last piece in the plurality of pieces of SD; and
    a packet generator that generates the packet including a bit width of the SD, a frequency of a sampling clock for sampling of an audio signal, the first timing information, the second timing information, the number of the pieces of the SD included in the one packet, and the SD.

(14)
  The communication apparatus according to (13), in which the packet generator generates the packet including information regarding the number of channels of the SD.
(15)
  A communication apparatus including:
    a recovering section that receives a packet transmitted from a communication partner apparatus, and recovers, from the packet, SD (Serial Data) conforming to an I2 S standard, a bit width of the SD, a frequency of a sampling clock for sampling of an audio signal, a frequency ratio of a frequency of an audio master clock to the frequency of the sampling clock, the number of a predetermined first reference clock included in one cycle of a divided signal of the audio master clock, the frequency of the sampling clock, and a ratio of division of the divided signal to the audio master clock;
    an audio master clock regenerator that regenerates the audio master clock on the basis of the number of the first reference clock, a frequency of the first reference clock, and the ratio of division; and
    an SCK regenerator that regenerates an SCK (Serial Clock) on the basis of bit width information regarding the SD, the frequency ratio, and the audio master clock.
(16)
  The communication apparatus according to (15), including:
    a clock regenerating circuit that generates a second reference clock synchronous with a signal change of the SD on the basis of the packet; and
    a frequency ratio calculating section that calculates a frequency ratio between the frequency of the first reference clock and the frequency of the second reference clock, in which
    the audio master clock regenerator regenerates the audio master clock on the basis of the number of the first reference clock, frequency information regarding the first reference clock, the ratio of division, and the frequency ratio calculated at the frequency ratio calculating section.
(17)
  The communication apparatus according to (15) or (16), including:
    a PTB clock generator that generates a PTB (Precision Time Base) clock to be used to generate timestamp information to be used in common by the communication apparatus and the communication partner apparatus, in which
    the first reference clock is the PTB clock.
(18)
  A communication apparatus including:
    a recovering section that receives a packet transmitted from a communication partner apparatus, and recovers, from the packet, SD (Serial Data) conforming to an I2 S standard, bit width information regarding the SD, frequency information regarding an SCK (Serial Clock), first timing information representing a timing of a first logical change of a WS (Word Select) signal included in the one packet, second timing information representing a timing of a last logical change of the WS signal, and the number of pieces of the SD included in the one packet;
    a clock generator that generates a reference clock to be used in common by the communication apparatus and the communication partner apparatus;

a WS signal regenerator that regenerates the WS signal on the basis of the first timing information, the second timing information, the number of the pieces of the SD, and the reference clock;

an audio master clock regenerator that regenerates an audio master clock with a frequency that is equal to a product of a frequency of the WS signal regenerated at the WS signal regenerator and a multiplier; and an SCK regenerator that regenerates the SCK on the basis of the WS signal regenerated at the WS signal regenerator and the bit width information regarding the SD.

(19)

The communication apparatus according to (14) or (18), including:

a PTB clock generator that generates a PTB (Precision Time Base) clock to be used to generate timestamp information to be used in common by the communication apparatus and a communication partner apparatus, in which the reference clock is the PTB clock.

(20)

The communication apparatus according to any one of (1) to (19), in which the packet is transmitted in a period allocated by TDD (Time Division Duplex).

(21)

A communication system including:

a first communication apparatus; and a second communication apparatus that performs serial communication with the first communication apparatus, in which the first communication apparatus includes a counting section that counts the number of a predetermined reference clock included in one cycle of a divided signal of an audio master clock with a frequency that is equal to a product of a frequency of a sampling clock for sampling of an audio signal and a multiplier on the basis of the audio master clock, a ratio of division of the divided signal, and the predetermined reference clock, and a packet generator that generates a packet including information including the number counted at the counting section, a bit width of SD (Serial Data) conforming to an I2 S standard, the frequency of the sampling clock, the ratio of division of the divided signal to the audio master clock, a frequency ratio of the frequency of the audio master clock to the frequency of the sampling clock, and the SD, and the second communication apparatus includes a recovering section that receives the packet transmitted from the first communication apparatus, and recovers, from the packet, the SD, the bit width of the SD, the frequency of the sampling clock, the frequency ratio of the frequency of the audio master clock to the frequency of the sampling clock, the number of a predetermined first reference clock included in one cycle of the divided signal of the audio master clock, the frequency of the sampling clock, and the ratio of division of the divided signal to the audio master clock, an audio master clock regenerator that regenerates the audio master clock on the basis of the number of the first reference clock, a frequency of the first reference clock, and the ratio of division, and an SCK regenerator that regenerates an SCK (Serial Clock) on the basis of bit width information regarding the SD, the frequency ratio, and the audio master clock.

(22)

A communication system including:

a first communication apparatus; and a second communication apparatus that performs serial communication with the first communication apparatus, in which the first communication apparatus includes a counting section that receives a WS (Word Select) signal conforming to an I2 S standard, and counts, on the basis of a predetermined reference clock used in common by the first communication apparatus and the second communication apparatus, first timing information representing a timing of a logical change of the WS signal in a first piece in a plurality of pieces of SD (Serial Data) included in one packet to be transmitted to the second communication apparatus, and second timing information representing a timing of a logical change of the WS signal in a last piece in the plurality of pieces of SD, and a packet generator that generates the packet including a bit width of the SD, a frequency of a sampling clock for sampling of an audio signal, the first timing information, the second timing information, the number of the pieces of the SD included in the one packet, and the SD, and the second communication apparatus includes a recovering section that receives the packet transmitted from the second communication apparatus, and recovers, from the packet, SD (Serial Data) conforming to an I2 S standard, bit width information regarding the SD, frequency information regarding an SCK (Serial Clock), first timing information representing a timing of a first logical change of a WS (Word Select) signal included in the one packet, second timing information representing a timing of a last logical change of the WS signal, and the number of pieces of the SD included in the one packet, a clock generator that generates a reference clock to be used in common by the second communication apparatus and the first communication apparatus, a WS signal regenerator that regenerates the WS signal on the basis of the first timing information, the second timing information, the number of the pieces of the SD, and the reference clock, an audio master clock regenerator that regenerates an audio master clock with a frequency that is equal to a product of a frequency of the WS signal regenerated at the WS signal regenerator and a multiplier, and an SCK regenerator that regenerates the SCK on the basis of the WS signal regenerated at the WS signal regenerator and the bit width information regarding the SD.

Aspects of the present disclosure are not limited to the individual embodiments mentioned above and cover various modifications that can be conceived of by those skilled in the art, and advantages of the present disclosure also are not limited to the content mentioned above. That is, various types of addition, change and partial deletion are possible within the scope not departing from the conceptual idea and gist of the present disclosure derived from the content stipulated in claims and equivalents thereof.

REFERENCE SIGNS LIST

1: Communication system
10: First communication module
20: Second communication module
100: First communication module
110: Microphone
120: First I2 S device
120-2: I2 S encoder
120-3: Clock generator
130: SerDes
130-1: PHY block
130-1-1: Link transmitting section
130-1-2: Link receiving section
130-1-3: PHY clock generator
130-1-3-1: PLL circuit
130-1-3-2: Clock divider
130-2: LINK block
130-2-1: Frame constructor
130-2-2: Frame deconstructor
130-2-3: OAM section
130-3: Encapsulator
130-3-2: MCK divider
130-3-4: Packet constructor
130-3-5: PTB time stampler
130-4: Deencapsulator
130-5: Control register
130-6: Clock generator
130-7: PTB clock generator
130-8: PTB timer
130t: SerDes
150: Camera
200: Second communication module
210: Speaker
220: I2 S device
220-1: I2 S decoder
220-3: Clock divider
230: SerDes
230-1: PHY block
230-1-1: Link transmitting section
230-1-2: Link receiving section
230-1-4: Clock divider
230-2: LINK block
230-2-2: Frame deconstructor
230-2-3: OAM section
230-3: Encapsulator
230-4-3: I2 S encoder
230-4: Deencapsulator
230-4-1: Packet deconstructor
230-4-10: PTB clock divider
230-4-3: I2 S encoder
230-4-4: RFECK ratio calculating section
230-4-5: TxREFCK regenerator
230-4-6: TxREFCK divider
230-4-7: MCK regenerator
230-4-7: Regenerator
230-4-8: SCK regenerator
230-4-8: Regenerator
230-4-9: WS frequency calculating section
230-5: Control register
230-6: PTB clock generator
230-6: Clock
250: Video decoder
250 MHz: Resolution
260: ADAS/ADS processor
300: Transmission cable

The invention claimed is:

1. A communication apparatus comprising:
a counting section that counts a number of clocks of a reference clock included in one cycle of a divided signal of an audio master clock with a frequency that is equal to a product of a frequency of a sampling clock for sampling of an audio signal and a multiplier on a basis of the audio master clock, a ratio of division of the divided signal, and the reference clock; and
a packet generator that generates a packet including information including the number of clocks counted at the counting section, a bit width of Serial Data (SD) conforming to an Inter-IC Sound (I2S) standard, the frequency of the sampling clock, the ratio of division of the divided signal to the audio master clock, a frequency ratio of the frequency of the audio master clock to the frequency of the sampling clock, and the SD.

2. The communication apparatus according to claim 1, wherein
the packet generated by the packet generator includes a header portion and a data portion,
the header portion includes the number of clocks counted at the counting section, the bit width of the SD, the frequency of the sampling clock, the ratio of division, and the frequency ratio, and
the data portion includes a plurality of pieces of the SD.

3. The communication apparatus according to claim 2, wherein
the header portion includes the bit width of the SD, a number of channels of the SD, the frequency of the sampling clock, the ratio of division of the divided signal to the audio master clock, the frequency ratio of the frequency of the audio master clock to the frequency of the sampling clock, a frequency of the reference clock, and the number of clocks counted at the counting section.

4. The communication apparatus according to claim 3, wherein the data portion includes the SD of all channels and all samples.

5. The communication apparatus according to claim 1, comprising:
a physical layer clock generator that generates a clock to be used in common by physical layers of both the communication apparatus and a communication partner apparatus; and
a divider that divides the clock generated at the physical layer clock generator and generates the reference clock.

6. The communication apparatus according to claim 5, wherein a frequency of the clock generated at the physical layer clock generator is 250 MHz.

7. The communication apparatus according to claim 6, wherein the frequency of the audio master clock is 25.6 MHz, and the frequency of the sampling clock is 50 kHz.

8. The communication apparatus according to claim 1, wherein the sampling clock and the audio master clock are asynchronous with the reference clock.

9. The communication apparatus according to claim 1, wherein the sampling clock and the audio master clock are synchronous with the reference clock.

10. The communication apparatus according to claim 1, comprising:
a Precision Time Base (PTB) clock generator that generates a PTB clock to be used to generate timestamp information to be used in common by the communication apparatus and a communication partner apparatus, wherein the reference clock is the PTB clock.

11. The communication apparatus according to claim 10, wherein the audio master clock is synchronous with the PTB clock.

12. The communication apparatus according to claim 10, wherein a frequency of the PTB clock is 250 MHz.

13. A communication apparatus comprising:
a recovering section that receives a packet transmitted from a communication partner apparatus, and recovers, from the packet, Serial Data (SD) conforming to an Inter-IC Sound (I2S) standard, a bit width of the SD, a frequency of a sampling clock for sampling of an audio signal, a frequency ratio of a frequency of an audio master clock to the frequency of the sampling clock, a number of clocks of a first reference clock included in one cycle of a divided signal of the audio master clock, the frequency of the sampling clock, and a ratio of division of the divided signal to the audio master clock;
an audio master clock regenerator that regenerates the audio master clock on a basis of the number of clocks of the first reference clock, a frequency of the first reference clock, and the ratio of division; and
an Serial Clock (SCK) regenerator that regenerates an SCK on a basis of bit width information regarding the SD, the frequency ratio, and the audio master clock.

14. The communication apparatus according to claim 13, comprising:
a clock regenerating circuit that generates a second reference clock synchronous with a signal change of the SD on a basis of the packet; and
a frequency ratio calculating section that calculates a frequency ratio between the frequency of the first reference clock and a frequency of the second reference clock, wherein
the audio master clock regenerator regenerates the audio master clock on a basis of the number of clocks of the first reference clock, frequency information regarding the first reference clock, the ratio of division, and the frequency ratio calculated at the frequency ratio calculating section.

15. The communication apparatus according to claim 13, comprising:
a Precision Time Base (PTB) clock generator that generates a PTB clock to be used to generate timestamp information to be used in common by the communication apparatus and the communication partner apparatus, wherein the first reference clock is the PTB clock.

16. The communication apparatus according to claim 1, wherein the packet is transmitted in a period allocated by Time Division Duplex (TDD).

* * * * *